United States Patent
Tomita et al.

(10) Patent No.: US 9,764,919 B2
(45) Date of Patent: *Sep. 19, 2017

(54) IMAGE FORMING APPARATUS, PROCESSING UNIT, AND IMAGE FORMING METHOD

(75) Inventors: Norio Tomita, Osaka (JP); Hiroshi Nakatani, Osaka (JP); Ryosuke Sakai, Osaka (JP); Takumi Mori, Osaka (JP); Kyosuke Taka, Osaka (JP); Kohichi Yamauchi, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 960 days.

This patent is subject to a terminal disclaimer.

(21) Appl. No.: 13/543,345

(22) Filed: Jul. 6, 2012

(65) Prior Publication Data

US 2013/0052350 A1 Feb. 28, 2013

(30) Foreign Application Priority Data

Aug. 25, 2011 (JP) .................. 2011-183917

(51) Int. Cl.
 B05C 13/02 (2006.01)
 B65H 37/00 (2006.01)
 B41J 3/60 (2006.01)
 G03G 15/00 (2006.01)
 B32B 37/00 (2006.01)

(52) U.S. Cl.
 CPC ............ B65H 37/00 (2013.01); B41J 3/60 (2013.01); G03G 15/6585 (2013.01); B32B 37/025 (2013.01); B65H 2301/5114 (2013.01); B65H 2801/27 (2013.01); G03G 2215/00801 (2013.01)

(58) Field of Classification Search
 CPC ........ Y10T 156/17; B32B 37/025; B41J 3/60; B65H 37/00; G03G 15/6585
 USPC ......................................................... 156/538
 See application file for complete search history.

(56) References Cited

U.S. PATENT DOCUMENTS

| 6,341,861 | B1 | 1/2002 | Sasaki | |
|---|---|---|---|---|
| 2004/0079475 | A1 | 4/2004 | Gayoso | |
| 2004/0159250 | A1* | 8/2004 | Khalid | B41J 13/14 101/225 |
| 2005/0220505 | A1* | 10/2005 | Hashimoto | G03G 15/2021 399/322 |

(Continued)

FOREIGN PATENT DOCUMENTS

| JP | 10-291307 A | 4/1998 |
|---|---|---|
| JP | 2001-213563 A | 8/2001 |

(Continued)

*Primary Examiner* — Philip Tucker
*Assistant Examiner* — John Blades
(74) *Attorney, Agent, or Firm* — Birch, Stewart, Kolasch & Birch, LLP

(57) ABSTRACT

An image forming apparatus includes a coating portion configured to perform a coating process that forms a coating film on a recording sheet with an image formed thereon, a main transport path configured to transport the recording sheet with the image formed thereon and to have a branching portion formed thereon, and a sub transport path configured to be once branched from the main transport path at the branching portion and to be returned to the main transport path again. The coating portion is disposed on the sub transport path.

12 Claims, 14 Drawing Sheets

(56) References Cited

U.S. PATENT DOCUMENTS

2010/0020119 A1* 1/2010 McConville ........... B41J 2/0057
                                                                                 347/9

FOREIGN PATENT DOCUMENTS

| | | | |
|---|---|---|---|
| JP | 2003-103880 A | 4/2003 | |
| JP | 2004-142942 A | 5/2004 | |
| JP | 2005-47027 A | 2/2005 | |
| JP | 2007-008622 * | 1/2007 | ............ B65H 29/70 |
| JP | 2007-301845 A | 11/2007 | |

* cited by examiner

IMAGE FORMING APPARATUS, PROCESSING UNIT, AND IMAGE FORMING METHOD

BACKGROUND OF THE INVENTION

This application claims priority under 35 U.S.C. §119 (a) on Patent Application No. 2011-183917 filed in Japan on Aug. 25, 2011, the entire contents of which are herein incorporated by reference.

The present invention relates to an image forming apparatus (e.g., a copier, a multifunction peripheral, and a printer), a processing unit, and an image forming method.

In a conventional image forming apparatus, typically, an image forming portion forms an obtained image on an image formation target such as an image carrier or a transfer target. For example, image formation according to an electrophotographic method is performed by charging a surface of an image carrier such as a photosensitive member that functions as an image formation target, exposing an image to the charged surface to form an electrostatic latent image, making visible (developing) the electrostatic latent image as a toner image, electrostatically transferring the visible toner image to an intermediate transfer member or a recording sheet such as a recording paper, and, if transferring the toner image to the intermediate transfer member, further transferring that image to a recording sheet.

Examples of such image forming apparatuses include an image forming apparatus in which a coating process that forms a coating film made of resin or the like is performed on a recording sheet that is being transported on a transport path for transporting (discharging) a recording sheet with an image formed thereon.

Incidentally, in an image forming apparatus that performs the coating process, the coating process speed (the transport speed at which a recording sheet is transported when performing the coating process on the recording sheet with an image formed thereon) is typically lower than the transport speed at which a recording sheet that is subjected to an image formation process that does not include a coating process is transported (discharged).

Since the transport speed of a recording sheet that requires the coating process is lower than the transport speed of a recording sheet that does not require the coating process, when transporting the recording sheet that does not require the coating process after the recording sheet that requires the coating process, the recording sheet that does not require the coating process has to be put on standby until the coating process ends. For example, if one job involves a recording sheet that requires the coating process and a recording sheet that does not require the coating process in a mixed manner, the succeeding recording sheet that does not require the coating process is put on standby for the preceding recording sheet that requires the coating process in that job. Furthermore, if the coating process is to be performed on a recording sheet in one job and the coating process is not to be performed on a recording sheet in another job, the succeeding job that does not require the coating process is put on standby for the preceding job that requires the coating process.

In this manner, in an image forming apparatus that performs the coating process, the processing time (throughput time) from when transport of a recording sheet that does not require the coating process starts to when the transport ends after image formation deteriorates when the coating process is performed.

With respect to this point, JP 2003-103880A discloses a printed material transporting apparatus, including a receiving end configured to receive, from a printing apparatus (image forming apparatus), a printed material (recording sheet) after printing (image formation) by the printing apparatus, the receiving end facing a discharging end of the printing apparatus, wherein the transporting apparatus transports the received printed material from the receiving end to a feeding end of a laminating apparatus (coating portion). In this configuration, the printed material after the printing by the printing apparatus is discharged to a transfer guide plate, and the printed material after the lamination process is discharged to a discharge tray.

However, in the configuration described in JP 2003-103880A, since a recording sheet that does not require the coating process and a recording sheet that has undergone the coating process are discharged to trays (specifically, the transfer guide plate and the discharge tray) arranged on different transport paths, there is a problem in which the recording sheet that has undergone the coating process and the recording sheet that does not require the coating process are discharged to different trays. For example, when performing the image formation on a plurality of recording sheets and further performing the coating process on part of the plurality of recording sheets in one job, pages of the recording sheets in that job cannot be aligned with each other.

It is an object of the present invention to provide an image forming apparatus, a processing unit, and an image forming method with which, when performing a coating process that forms a coating film on a recording sheet with an image formed thereon, the processing time (throughput time) from when transport of a recording sheet that does not require the coating process starts to when the transport ends after image formation can be effectively prevented from deteriorating, and, moreover, in which the recording sheet that has undergone the coating process and the recording sheet that does not require the coating process can be transported to the same transport path.

SUMMARY OF THE INVENTION

In order to solve the above-described problems, the present invention provides an image forming apparatus, a processing unit, and an image forming method as described below.

(1) Image Forming Apparatus

The present invention is directed to an image forming apparatus, comprising: a coating portion configured to perform a coating process that forms a coating film on a recording sheet with an image formed thereon; a main transport path configured to transport the recording sheet with the image formed thereon and to have a branching portion formed thereon; and a sub transport path configured to be once branched from the main transport path at the branching portion and to be returned to the main transport path again; wherein the coating portion is disposed on the sub transport path.

(2) Processing Unit

Moreover, the present invention is directed to a processing unit that is attachable to and removable from an image forming apparatus main body that forms an image on a recording sheet, comprising: a coating portion configured to perform a coating process that forms a coating film on the recording sheet with the image formed thereon by the image forming apparatus main body; a main transport path configured to transport the recording sheet with the image formed thereon by the image forming apparatus main body and to have a branching portion formed thereon; and a sub transport path configured to be once branched from the main transport path at the branching portion and to be returned to the main transport path again; wherein the coating portion is disposed on the sub transport path.

(3) Image Forming Method

Moreover, the present invention is directed to an image forming method in which a coating process that forms a coating film is performed on a recording sheet with an image formed thereon, comprising: transporting the recording sheet from a main transport path for transporting the recording sheet to a sub transport path that is branched from the main transport path and is returned to the main transport path again, and performing the coating process on the recording sheet that is being transported on the sub transport path.

According to the present invention, when performing the coating process, the recording sheet that has been transported on the main transport path can be transported to the sub transport path, and the recording sheet can be returned to the main transport path again after the coating process is performed on that recording sheet during transport on the sub transport path. Thus, while the recording sheet that requires the coating process is transported via the sub transport path, the recording sheet that does not require the coating process can be directly transported on the main transport path. Accordingly, even in the case where the transport speed of the recording sheet that requires the coating process is lower than the transport speed of the recording sheet that does not require the coating process, the recording sheet that does not require the coating process is not put on standby until the coating process ends. Thus, the processing time (throughput time) from when transport of the recording sheet that does not require the coating process starts to when the transport ends after image formation can be effectively prevented from deteriorating.

Moreover, since the recording sheet is returned to the main transport path after the coating process is performed on that recording sheet during transport on the sub transport path, the recording sheet that has undergone the coating process and the recording sheet that does not require the coating process can be transported to the same transport path.

In the present invention, the coating portion may perform the coating process on either of both faces of the recording sheet.

According to this aspect, it is possible to satisfy a request to perform not only a single-sided coating process that performs the coating process on either one face (front face) of the recording sheet but also a double-sided coating process that performs the coating process on both faces of the recording sheet.

In the present invention, the coating portion may be configured by a pair of coating portions each of which performs the coating process on one corresponding side of both faces of the recording sheet.

According to this aspect, while one of the pair of coating portions can perform the coating process on either one face (front face) of the recording sheet, the other coating portion can perform the coating process on the other face (back face) of the recording sheet.

In the present invention, at least one of the pair of coating portions may be attachable and removable.

According to this aspect, since at least one of the pair of coating portions is attachable and removable, at least that coating portion is easily attachable and removable, and the efficiency of the operation that causes that coating portion to be attached and detached can be improved.

In the present invention, the sub transport path may include a first sub transport path that is branched at the branching portion, and a second sub transport path that is connected to the first sub transport path and that is merged at a merging portion on a downstream side in a recording sheet transport direction of the branching portion on the main transport path.

According to this aspect, the sub transport path can return the recording sheet on the second sub transport path to the downstream side in the transport direction of the branching portion on the main transport path, so that the transport distance of the recording sheet, that is, the time required to transport the recording sheet can be shortened.

In the present invention, respective coating portions may be arranged on the first sub transport path and the second sub transport path.

According to this aspect, the coating process can be performed on the recording sheet that is being transported on the first sub transport path, and the coating process can be performed also on the recording sheet that is being transported on the second sub transport path. Accordingly, the coating process can be performed with a sufficient transport distance due to the first sub transport path and the second sub transport path.

In the present invention, the pair of coating portions may be arranged such that a distance between coating process portions that perform the coating process on the recording sheet is larger than a maximum transport length for transporting the recording sheet of a maximum size.

According to this aspect, since the pair of coating portions is arranged such that a distance between coating process portions is larger than the maximum transport length, it is possible for either one of the pair of coating portions not to perform the coating process when the other coating portion is performing the coating process. Accordingly, the occurrence of problems such as creases in the coating film formed on the recording sheet can be suppressed. Thus, the coating performance in the coating process performed at substantially the same time by both the pair of coating portions can be maintained.

In the present invention, the coating portion may be disposed such that a distance between a coating process portion that performs the coating process on the recording sheet and a transport roller pair that is disposed in closest proximity to the branching portion on an upstream side in a transport direction of the branching portion is larger than a maximum transport length for transporting the recording sheet of a maximum size.

According to this aspect, since the coating portion is disposed such that a distance between the coating process portion and the transport roller pair is larger than the maximum transport length, the transport speed on the main transport path can be maintained even in the case where the transport speed on the main transport path is different from that on the sub transport path.

In the present invention, a transport speed of the recording sheet that is being transported on the sub transport path may be made smaller than a transport speed of the recording sheet that is being transported on the main transport path at least in a period during which the coating process is performed.

According to this aspect, since a transport speed of the recording sheet that is being transported on the sub transport path is made smaller than a transport speed of the recording sheet that is being transported on the main transport path at least in a period during which the coating process is performed, the occurrence of problems such as unevenness, gloss loss, and creases in the coating film formed on the recording sheet can be suppressed, so that the coating performance can be suppressed from deteriorating. Note that reducing the transport speed of the recording sheet that is being transported on the sub transport path is a concept that includes stopping the recording sheet.

In the present invention, a timing to make the transport speed small when performing the coating process may correspond to a timing after an upstream edge in the transport direction of the recording sheet that is being transported by a transport roller pair disposed in closest proximity to the branching portion on an upstream side in a transport direction of the branching portion has passed through the transport roller pair on the main transport path.

According to this aspect, the transport speed of the recording sheet that is being transported on the sub transport path can be made small without be small the transport speed of the recording sheet that is being transported on the main transport path. Accordingly, the transport speed of the recording sheet that is being transported on the main transport path can be maintained.

In the present invention, the image forming apparatus may further include a curling correcting portion configured to correct curling of the recording sheet, disposed on an upstream side in a transport direction of the coating portion on the sub transport path.

According to this aspect, since the curling correcting portion is provided on the upstream side in the transport direction of the coating portion on the sub transport path, the curling correcting portion can correct curling of the recording sheet before the coating portion performs the coating process. Thus, the coating performance in the coating process performed by the coating portion can be accordingly suppressed from deteriorating.

In the present invention, the coating process may be a process that causes a transparent resin material disposed on a film base member to be thermally attached to the recording sheet with the image formed thereon.

According to this aspect, the coating film can be formed on the recording sheet with relatively simple configuration and at low cost.

In the present invention, the image forming apparatus may further include a processing unit configured to be attachable to and removable from an image forming apparatus main body that forms an image on the recording sheet, and the coating portion, the main transport path, and the sub transport path may be arranged in the processing unit.

According to this aspect, the processing unit including the coating portion, the main transport path, and the sub transport path is preferably sold as an optional extra. Accordingly, the coating portion can be provided only to a user who needs the coating portion, and an image forming apparatus can be provided at as low cost as possible to a user who does not need the coating portion.

BRIEF DESCRIPTION OF THE DRAWINGS

FIG. 6 includes FIGS. 6A and 6B, which are views for illustrating a pair of coating portions shown in FIGS. 1 and 2, wherein

DESCRIPTION OF REFERENCE NUMERALS

Figure 1:
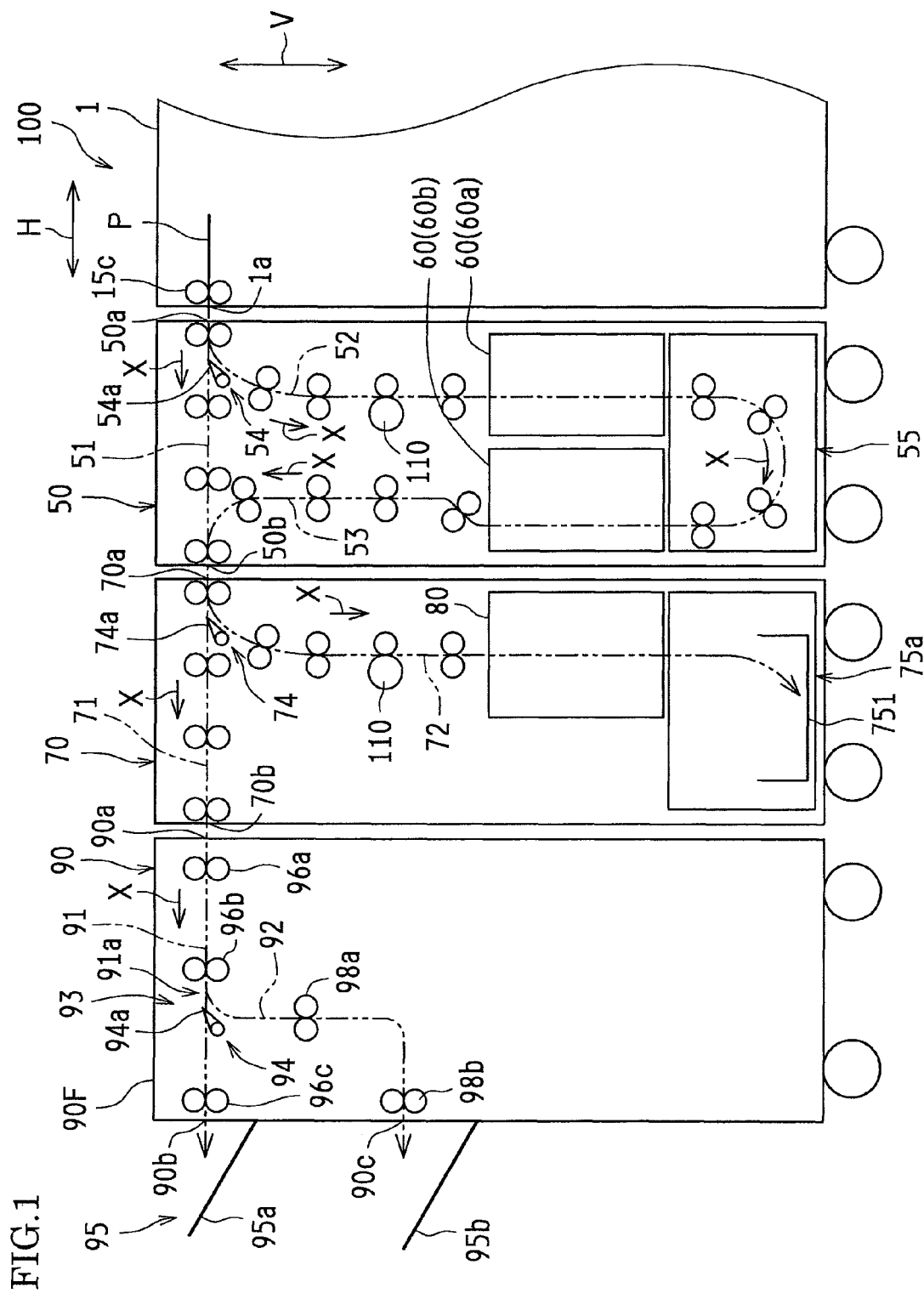
FIG. 1 is a schematic front view showing the vicinity of processing units of an image forming apparatus according to a first embodiment.

1 Image forming apparatus main body
3 Image forming portion
40 Calibration recording sheet
41 Test pattern
50 First relay unit (exemplary processing unit)
51 First main transport path (exemplary main transport path)
51*a* First branching portion
51*b* First merging portion
52 First sub transport path (exemplary sub transport path)
53 Second sub transport path (exemplary sub transport path)
57*a* One coating registration roller pair
57*b* Another coating registration roller pair
58*a* to 58*i* Transport roller pair
60 Coating portion
60*a* One coating portion
60*b* Another coating portion
70 Second relay unit (exemplary processing unit)
71 Second main transport path
71*a* Second branching portion
71*b* Second merging portion
72 Third sub transport path
73 Fourth sub transport path
77 Reading registration roller pair
78*a* to 78*m* Transport roller pair
80 Reading portion 87 Downstream transport roller pair
91 Third main transport path
100 Image forming apparatus according to first embodiment
100A Image forming apparatus according to second embodiment
100B Image forming apparatus according to third embodiment
110 Curling correcting portion
653 Pressure bonding member
F1 Film base member
F2 Transparent resin material
P Recording sheet

DESCRIPTION OF THE EMBODIMENTS

Hereinafter, embodiments of the present invention will be described with reference to the drawings. Note that the following embodiments are specific examples of the present invention and are not to limit the technical scope of the present invention.

First Embodiment

FIG. 1 is a schematic front view showing the vicinity of processing units of an image forming apparatus 100 according to the first embodiment.

First, the configurations of first and second relay units 50 and 70 and a discharge unit 90 in the image forming apparatus 100 according to the first embodiment will be described, and, then, an image forming apparatus main body 1, coating portions 60 provided in the first relay unit 50, and a reading portion 80 provided in the second relay unit 70 will be sequentially described in detail.

Regarding the Image Forming Apparatus

The image forming apparatus 100 shown in FIG. 1 is provided with the image forming apparatus main body 1, the first relay unit 50, the second relay unit 70, and the discharge unit 90. The image forming apparatus 100 in this example functions as a high-speed printer connected to an image processing apparatus such as a personal computer. The first relay unit 50, the second relay unit 70, and the discharge unit 90 function as processing units.

In the image forming apparatus 100, the first relay unit 50 is attached in a horizontal direction H to the image forming apparatus main body 1, the second relay unit 70 is attached in the horizontal direction H to the first relay unit 50, and the discharge unit 90 is attached in the horizontal direction H to the second relay unit 70. Note that the symbol V indicates a vertical direction orthogonal to the horizontal direction H.

The image forming apparatus 100 is provided with an ordinary image formation mode for forming an ordinary image on a recording sheet P such as paper using an image forming portion 3 (see FIG. 5 described later) in the image forming apparatus main body 1, a coating mode for performing a coating process that forms a coating film on the recording sheet P having the image formed by the image forming portion 3, and a calibration mode for adjusting the image quality of the image forming portion 3 by forming a test pattern (exemplary calibration chart) 41 (see FIG. 8 described later) such as a measurement patch on the recording sheet P using the image forming portion 3.

In the image forming apparatus 100, an operator such as a user selects either the ordinary image formation mode or the calibration mode. More specifically, in the image forming apparatus 100, when applying the ordinary image formation mode, an operator selects whether to form an ordinary image in the coating mode (i.e., to apply the ordinary image formation mode with the coating mode) or to form an ordinary image not in the coating mode (i.e., to apply the ordinary image formation mode without the coating mode). On the other hand, when applying the calibration mode, an operator selects whether to perform calibration in the coating mode (i.e., to apply the calibration mode with the coating mode) or to perform calibration not in the coating mode (i.e., to apply the calibration mode without the coating mode).

The image forming apparatus main body 1 is configured such that, in the ordinary image formation mode, an ordinary image is formed on the recording sheet P and the recording sheet on which the ordinary image has been formed (hereinafter, it may be referred to as an "ordinary recording sheet") is fed to the first relay unit 50, and such that, in the calibration mode, the test pattern 41 is formed on the recording sheet P and the recording sheet on which the test pattern 41 has been formed (hereinafter, it may be referred to as a "calibration recording sheet 40" (see FIG. 8)) is fed to the first relay unit 50. The configuration of the image forming apparatus main body 1 will be described later in detail with reference to FIG. 5.

Here, an "ordinary image" refers to, for example, an image read by an image reading device 2 (see FIG. 5) or an image based on image data created by application software in an external image processing apparatus. Also, the calibration recording sheet 40 (see FIG. 8) refers to a recording sheet for adjusting the image quality of the image forming portion 3.

First Relay Unit

Figure 2:
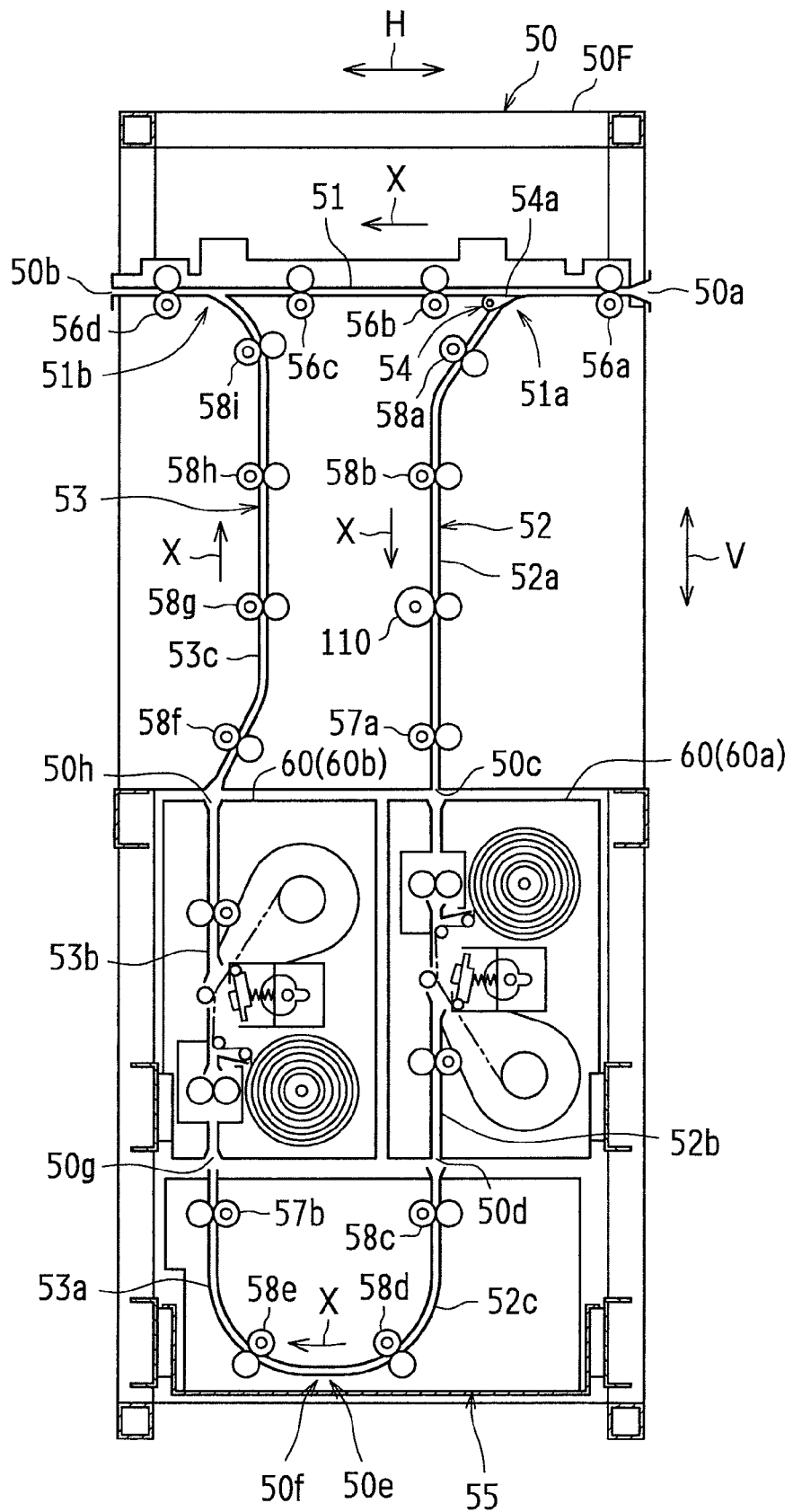
FIG. 2 is a front view showing the schematic configuration of a first relay unit in the image forming apparatus according to the first embodiment.

FIG. 2 is a front view showing the schematic configuration of the first relay unit 50 in the image forming apparatus 100 according to the first embodiment.

The first relay unit 50 is attachable to and removable from the image forming apparatus main body 1, and is a relay unit that performs relaying between the image forming apparatus main body 1 and the second relay unit 70. The first relay unit 50 is provided with the coating portions 60 that perform the coating process on the recording sheet P. In the first embodiment, the coating portions 60 are configured by a pair of coating portions (hereinafter, they may be respectively referred to as "first and second coating portions") 60a and 60b that perform the coating process respectively on both faces of the recording sheet P. The first coating portion 60a performs the coating process on one face (front face) of the recording sheet P, and the second coating portion 60b performs the coating process on the other face (back face) of the recording sheet P. The coating portions 60a and 60b will be described later in detail with reference to FIGS. 6A and 6B.

In the first embodiment, the first relay unit 50 is provided with a transport unit 55 with which the recording sheet P carried out from the first coating portion 60a is carried into the second coating portion 60b.

In the first relay unit 50 of the image forming apparatus 100, when performing the coating process on the recording sheet P, the recording sheet P is subjected to the coating process at the first coating portion 60a, transported via the transport unit 55, subjected to the coating process at the second coating portion 60b, and then fed to the second relay unit 70. On the other hand, when not performing the coating process on the recording sheet P, the recording sheet P from the image forming apparatus main body 1 is directly fed to the second relay unit 70 without being transported via the coating portions 60a and 60b and the transport unit 55.

Whether or not to perform the coating process is selected or set by an operator such as a user through an instruction signal from display and operation portions (e.g., a display portion such as a display screen of an image processing apparatus such as a personal computer and an operation portion such as a keyboard and a pointing device (not shown)) connected to the image forming apparatus main body 1.

Specifically, the first relay unit 50 is further provided with a first main transport path 51, a first sub transport path 52, a second sub transport path 53, a first gate portion 54, and a frame member 50F that supports the constituent members of the first relay unit 50. Furthermore, the first sub transport path 52 and the second sub transport path 53 form sub transport paths branched from the first main transport path 51. Specifically, a first branching portion 51a (see below) and a first merging portion 51b (see below) are formed on the first main transport path 51, the first main transport path 51 is branched into the first sub transport path 52 at the first branching portion 51a, and the first sub transport path 52 obtained by the branching extends into the second sub transport path 53 and is returned again to the first main transport path 51 at the first merging portion 51b. That is to say, the first sub transport path 52 and the second sub transport path 53 according to this embodiment are configured such that the first main transport path 51 is once branched into the first sub transport path 52 at the first branching portion 51a and the second sub transport path 53 is returned to the first main transport path 51 at the first merging portion 51b.

The first main transport path 51 is configured such that the recording sheet P having the image formed by the image forming portion 3 (see FIG. 5) in the image forming apparatus main body 1 is transported in a transport direction (the arrows X in FIG. 2) and carried to the outside. Here, the "recording sheet with the image formed thereon" refers to a recording sheet with the image formed thereon through an image forming process by the image forming portion 3 regardless of whether or not an image has been actually formed.

Specifically, the first main transport path 51 has one end connected to a carry-in port 50a of the first relay unit 50 main body and the other end connected to a carry-out port 50b from which the recording sheet P is carried out, and extends in the horizontal direction H between the carry-in port 50a and the carry-out port 50b. The carry-in port 50a is disposed at one end in the horizontal direction H of the first relay unit 50 main body so as to oppose a carry-out port 1a (see FIG. 1) of the image forming apparatus main body 1, and is a carry-in port at which the recording sheet P carried out from the carry-out port 1a is carried in.

The first sub transport path 52 is a transport path branched from the first main transport path 51 at the first branching portion 51a on the first main transport path 51.

Specifically, the first sub transport path 52 is provided with an upstream coating transport path 52a that is disposed on the upstream side in the transport direction X of the first coating portion 60a, a coating transport path 52b that is disposed in the first coating portion 60a, and a downstream coating transport path 52c that is disposed on the downstream side in the transport direction X of the first coating portion 60a.

The upstream coating transport path 52a has one end facing the first branching portion 51a and the other end connected to a carry-in port 50c of the first coating portion 60a main body. The upstream coating transport path 52a is curved so as to extend in the vertical direction V, which forms an angle of 90° (or substantially 90°) with the first main transport path 51 (see the transport direction X in the first main transport path 51), such that the other end extends in the vertical direction V. The carry-in port 50c is disposed at the upper end in the vertical direction V of the first coating portion 60a main body, and is a carry-in port at which the recording sheet P is carried in.

The coating transport path 52b has one end corresponding to the carry-in port 50c and the other end corresponding to a carry-out port 50d of the first coating portion 60a main body, and extends in the vertical direction V between the carry-in port 50c and the carry-out port 50d. The carry-out port 50d is disposed at the lower end in the vertical direction V of the first coating portion 60a main body, and is a carry-out port from which the recording sheet P is carried out.

The downstream coating transport path 52c has one end connected to the carry-out port 50d of the first coating portion 60a and the other end positioned at a lower end portion 50e of the transport unit 55, and extends so as to be curved in the horizontal direction (the direction H shown in FIG. 2), which forms an angle of 90° (or substantially 90°) with the vertical direction V, between the carry-out port 50d and the lower end portion 50e.

The second sub transport path 53 is configured so as to be connected to the first sub transport path 52, and to be merged with the first main transport path 51 at the first merging portion 51b, which is on the downstream side in the transport direction X of the first branching portion 51a on the first main transport path 51.

Specifically, the second sub transport path 53 is provided with an upstream coating transport path 53a that is disposed on the upstream side in the transport direction X of the second coating portion 60b, a coating transport path 53b that is disposed in the second coating portion 60b, and a downstream coating transport path 53c that is disposed on the downstream side in the transport direction X of the second coating portion 60b.

The upstream coating transport path 53a has one end facing a lower end portion 50f of the transport unit 55 and the other end connected to a carry-in port 50g of the second coating portion 60b main body, and extends so as to be curved in the vertical direction V, which forms an angle of 90° (or substantially 90°) with the horizontal direction (the direction H shown in FIG. 2), between the lower end portion 50f and the carry-in port 50g. The carry-in port 50g is disposed at the lower end in the vertical direction V of the second coating portion 60b main body, and is a carry-in port at which the recording sheet P is carried in.

The coating transport path 53b has one end corresponding to the carry-in port 50g and the other end corresponding to a carry-out port 50h of the second coating portion 60b main body, and extends in the vertical direction V between the carry-in port 50g and the carry-out port 50h. The carry-out port 50h is disposed at the upper end in the vertical direction V of the second coating portion 60b main body, and is a carry-out port from which the recording sheet P is carried out.

The downstream coating transport path 53c has one end connected to the carry-out port 50h and the other end facing the first merging portion 51b. The downstream coating transport path 53c extends in the vertical direction V while making a detour by a preset distance toward the upstream coating transport path 52a, and has a point where the downstream coating transport path 53c is curved toward the first merging portion 51b in the horizontal direction (the direction H shown in FIG. 2), which forms an angle of 90° (or substantially 90°) with the vertical direction V.

The first gate portion 54 is disposed near the first branching portion 51a, and is configured so as to switch the first main transport path 51 and the first sub transport path 52 as a transport path on which the recording sheet P from the image forming apparatus main body 1 is to be transported.

Specifically, the first gate portion 54 is provided with a first branching claw 54a. The first branching claw 54a is configured so as to be in a first posture (the posture shown in FIG. 2) where the recording sheet P from the carry-out port 1a of the image forming apparatus main body 1 is guided toward the first main transport path 51 and in a second posture (the posture shown in FIG. 1) where the recording sheet P from the carry-out port 1a of the image forming apparatus main body 1 is guided toward the first sub transport path 52. The first gate portion 54 is electrically connected to a control portion 200 (see FIG. 10 described later), and switches the first posture and the second posture in response to an instruction signal from the control portion 200.

In the first embodiment, the first relay unit 50 is provided with a plurality of main transport roller pairs 56a to 56d, two coating registration roller pairs (hereinafter, they may be respectively referred to as "first and second coating registration roller pairs) 57a and 57b, a plurality of sub transport roller pairs 58a to 58i, and a curling correcting portion (specifically, a decurler) 110.

The main transport roller pair 56a is disposed between the carry-in port 50a and the first branching portion 51a on the first main transport path 51. The main transport roller pairs 56b and 56c are arranged between the first branching portion 51a and the first merging portion 51b on the first main transport path 51. The main transport roller pair 56d is disposed between the first merging portion 51b and the carry-out port 50b on the first main transport path 51.

The first coating registration roller pair 57a is disposed in closest proximity to the coating portion 60a on the upstream side in the transport direction X of the first coating portion 60a. The second coating registration roller pair 57b is disposed in closest proximity to the coating portion 60b on the upstream side in the transport direction X of the second coating portion 60b. Diagonal transport of the recording sheet P can be corrected at the coating registration roller pairs 57a and 57b, by once stopping the transport of the recording sheet P by bringing the downstream edge in the transport direction X (leading edge) of the recording sheet P into contact with the coating registration roller pairs 57a and 57b in a state where their rotation has been stopped, and then resuming the transport of the recording sheet P. Accordingly, the pair of coating portions 60a and 60b can perform the coating process such that the coating film formation timing matches the transport timing of the recording sheet P in the state where the diagonal transport has been suppressed at the coating registration roller pairs 57a and 57b.

The sub transport roller pairs 58a and 58b are arranged between the first branching portion 51a and the first coating registration roller pair 57a on the first sub transport path 52. The sub transport roller pairs 58c and 58d are arranged between the first coating portion 60a and the lower end portion 50e on the first sub transport path 52. The sub transport roller pair 58e is disposed between the lower end portion 50f and the second coating registration roller pair 57b on the second sub transport path 53. The sub transport roller pairs 58f to 58i are arranged between the second coating registration roller pair 57b and the first merging portion 51b on the second sub transport path 53.

The curling correcting portion 110 is disposed on the upstream side in the transport direction X of the first coating portion 60a, and, in this example, is disposed between the sub transport roller pair 58b and the first coating registration roller pair 57a. The curling correcting portion 110 will be described later in detail with reference to FIG. 9.

Note that, in the transport unit 55, the downstream coating transport path 52c and the upstream coating transport path 53a form a U-shaped transport path on which the recording sheet P transported in the transport direction X is turned up at the lowest point (the lower end portions 50e and 50f).

Second Relay Unit

Figure 3:
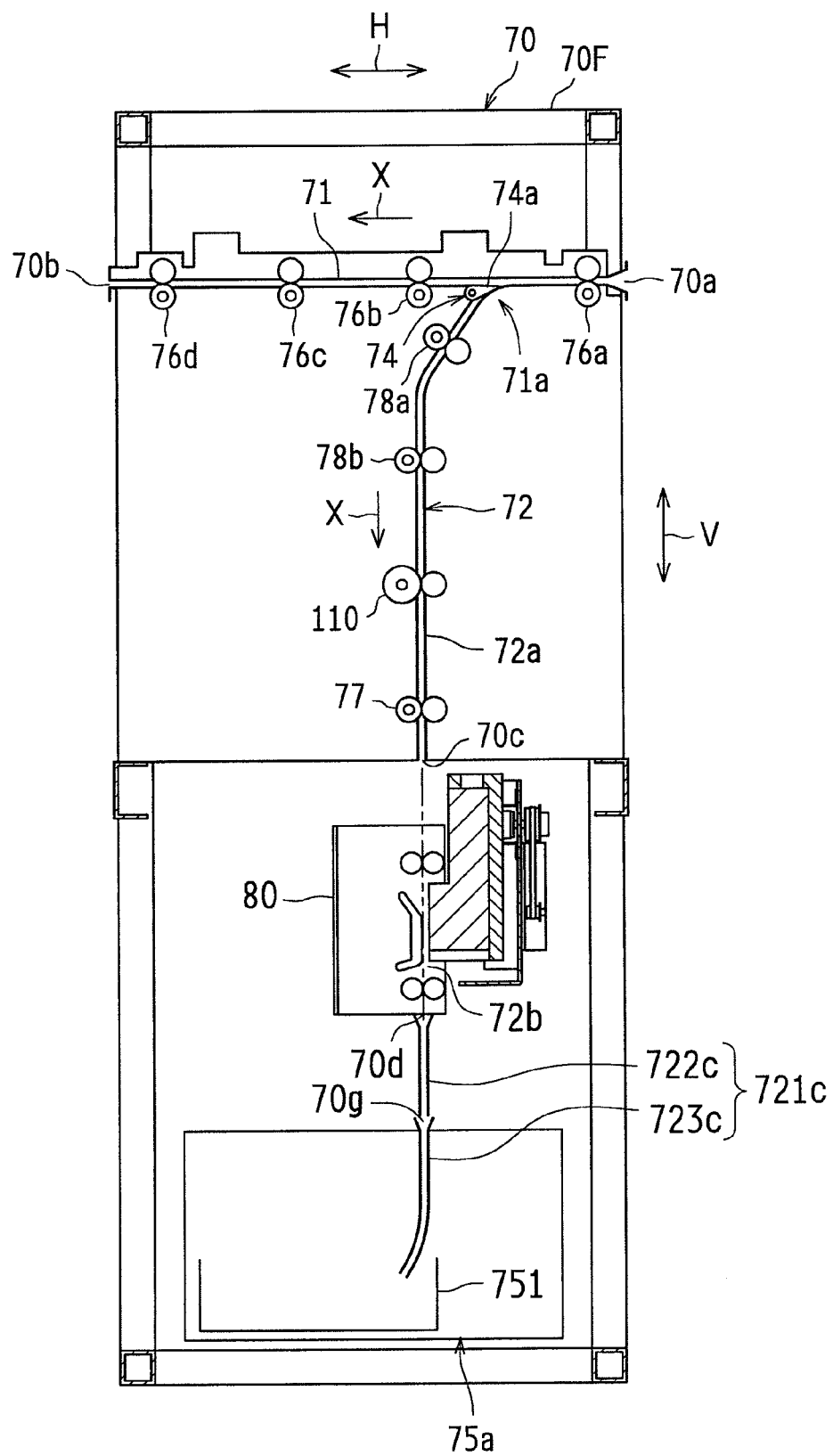
FIG. 3 is a front view showing the schematic configuration of a second relay unit in the image forming apparatus according to the first embodiment.

FIG. 3 is a front view showing the schematic configuration of the second relay unit 70 in the image forming apparatus 100 according to the first embodiment.

The second relay unit 70 is attachable to and removable from the first relay unit 50, and is a relay unit that performs relaying between the first relay unit 50 and the discharge unit 90. The second relay unit 70 is provided with the reading portion 80 that reads the test pattern 41 (see FIG. 8) formed on the calibration recording sheet 40 (see FIG. 8) by the image forming portion 3 (see FIG. 5) in the image forming apparatus main body 1 in order to perform a calibration process on an image formed by the image forming portion 3. The reading portion 80 will be described later in detail with reference to FIG. 9.

In the first embodiment, the second relay unit 70 is provided with a stacker unit 75a where the calibration recording sheet 40 whose test pattern 41 has been read by the reading portion 80 is to be accommodated (discarded). The stacker unit 75a is provided with an accommodation container 751.

In the second relay unit 70 of the image forming apparatus 100, when performing the calibration process on the image forming portion 3 by forming the test pattern 41, the calibration recording sheet 40 is accommodated in the accommodation container 751 in the stacker unit 75a after the test pattern 41 on the calibration recording sheet 40 is read by the reading portion 80. On the other hand, when not performing the calibration process on the image forming portion 3 by forming an ordinary image, the ordinary recording sheet P (see FIG. 1) from the first relay unit 50 is directly transported to a second main transport path 71 and fed to the discharge unit 90.

Whether or not to perform the calibration process on the image forming portion 3 is selected or set by an operator such as a user through an instruction signal from display and operation portions connected to the image forming apparatus main body 1. The calibration process is, for example, performed as appropriate as necessary on a selection screen displayed by executing a printer driver, or performed on a regular basis (e.g., at preset times, or in every preset period of time). Regarding this calibration process, a storage portion 202 (see FIG. 10, described later) stores in advance a first standard value SD1 associated with a standard image that has undergone the coating process and a second standard value SD2 associated with a standard image that does not require the coating process. When performing the calibration process on the image forming portion 3 in a state where the coating process has been performed on the calibration recording sheet 40, the test pattern 41 on the calibration recording sheet 40 on which the coating process has been performed is read, and the read value and the first standard value SD1 are compared, thereby performing the calibration process. On the other hand, when performing the calibration process on the image forming portion 3 in a state where the coating process has not been performed on the calibration recording sheet 40, the test pattern 41 on the calibration recording sheet 40 on which the coating process has not been performed is read, and the read value and the second standard value SD2 in the storage portion 202 are compared, thereby performing the calibration process.

Specifically, the second relay unit 70 is further provided with the second main transport path 71, a third sub transport path 72, a second gate portion 74, and a frame member 70F that supports these members.

The second main transport path 71 is configured such that the recording sheet P from the carry-out port 50b of the first relay unit 50 main body is transported in the transport direction X and carried to the outside.

Specifically, the second main transport path 71 has one end connected to a carry-in port 70a of the second relay unit 70 main body and the other end connected to a carry-out port 70b from which the recording sheet P is carried out, and extends in the horizontal direction H between the carry-in port 70a and the carry-out port 70b. The carry-in port 70a is disposed at one end in the horizontal direction H of the second relay unit 70 main body so as to oppose the carry-out port 50b of the first relay unit 50 main body, and is a carry-in port at which the recording sheet P carried out from the carry-out port 50b is carried in.

The third sub transport path 72 is configured so as to be branched from the second main transport path 71 at a second branching portion 71a.

Specifically, the third sub transport path 72 is provided with an upstream reading transport path 72a that is disposed on the upstream side in the transport direction X of the reading portion 80, a reading transport path 72b that is disposed in the reading portion 80, and a link transport path 721c that is disposed on the downstream side in the transport direction X of the reading portion 80.

The upstream reading transport path 72a has one end facing the second branching portion 71a and the other end connected to a carry-in port 70c of the reading portion 80 main body. The upstream reading transport path 72a is curved so as to extend from the second branching portion 71a in the vertical direction V, which forms an angle of 90° (or substantially 90°) with the horizontal direction H, such that the other end extends in the vertical direction V. The carry-in port 70c is disposed at the upper end in the vertical direction V of the reading portion 80 main body, and is a carry-in port at which the recording sheet P is carried in.

The reading transport path 72b has one end corresponding to the carry-in port 70c and the other end corresponding to a carry-out port 70d of the reading portion 80 main body, and extends in the vertical direction V between the carry-in port 70c and the carry-out port 70d. The carry-out port 70d is disposed at the lower end in the vertical direction V of the reading portion 80 main body, and is a carry-out port from which the recording sheet P is carried out.

The link transport path 721c is configured by a relay transport path 722c and a discharge transport path 723c. The relay transport path 722c has one end connected to the carry-out port 70d of the reading portion 80 main body and the other end connected to a carry-in port 70g of the stacker unit 75a main body, and extends in the vertical direction V between the carry-out port 70d and the carry-in port 70g. The carry-in port 70g is disposed at the upper end in the vertical direction V of the stacker unit 75a main body, and is a carry-in port at which the recording sheet P from the carry-out port 70d is carried in. The discharge transport path 723c has one end corresponding to the carry-in port 70g and the other end facing the vicinity of the accommodation container 751 in the stacker unit 75a.

The second gate portion 74 is disposed near the second branching portion 71a, and is configured so as to switch the second main transport path 71 and the third sub transport path 72 as a transport path on which the recording sheet P from the first relay unit 50 is to be transported.

Specifically, the second gate portion 74 is provided with a second branching claw 74a. The second branching claw 74a is configured so as to be in a first posture (the posture shown in FIG. 3) where the recording sheet P from the carry-out port 50b of the first relay unit 50 main body is guided toward the second main transport path 71 and in a second posture (the posture shown in FIG. 1) where the recording sheet P from the carry-out port 50b of the first relay unit 50 main body is guided toward the third sub transport path 72. The second gate portion 74 is electrically connected to the control portion 200 (see FIG. 10, described later), and switches the first posture and the second posture in response to an instruction signal from the control portion 200.

In the first embodiment, the second relay unit 70 is provided with a plurality of main transport roller pairs 76a to 76d, a reading registration roller pair 77, a plurality of sub transport roller pairs 78a and 78b, and the curling correcting portion 110.

The main transport roller pair 76a is disposed between the carry-in port 70a and the second branching portion 71a on the second main transport path 71. The main transport roller pairs 76b to 76d are arranged between the second branching portion 71a and the carry-out port 70b on the first main transport path 51.

The reading registration roller pair 77 is disposed in closest proximity to the reading portion 80 on the upstream side in the transport direction X of the reading portion 80. Diagonal transport of the calibration recording sheet 40 (see FIG. 8) can be corrected at the reading registration roller pair 77, by once stopping the transport of the calibration recording sheet 40 by bringing the downstream edge in the transport direction X (leading edge) of the calibration recording sheet 40 into contact with the reading registration roller pair 77 in a state where its rotation has been stopped, and then resuming the transport of the calibration recording sheet 40. Accordingly, the reading portion 80 can read the test pattern 41 such that the reading timing of the test pattern 41 by the reading portion 80 matches the transport timing of the calibration recording sheet 40 in the state where the diagonal transport has been suppressed at the reading registration roller pair 77.

The sub transport roller pairs 78a and 78b are arranged between the second branching portion 71a and the reading registration roller pair 77 on the third sub transport path 72.

The curling correcting portion 110 is disposed on the upstream side in the transport direction X of the reading portion 80, and, in this example, is disposed between the sub transport roller pair 78b and the reading registration roller pair 77. The curling correcting portion 110 will be described later in detail with reference to FIG. 9.

Fourth Sub Transport Path and Transport Unit

In the first embodiment, the second relay unit 70 may be provided with a fourth sub transport path 73 and a transport unit 75b (see FIG. 4) instead of the stacker unit 75a.

Figure 4:
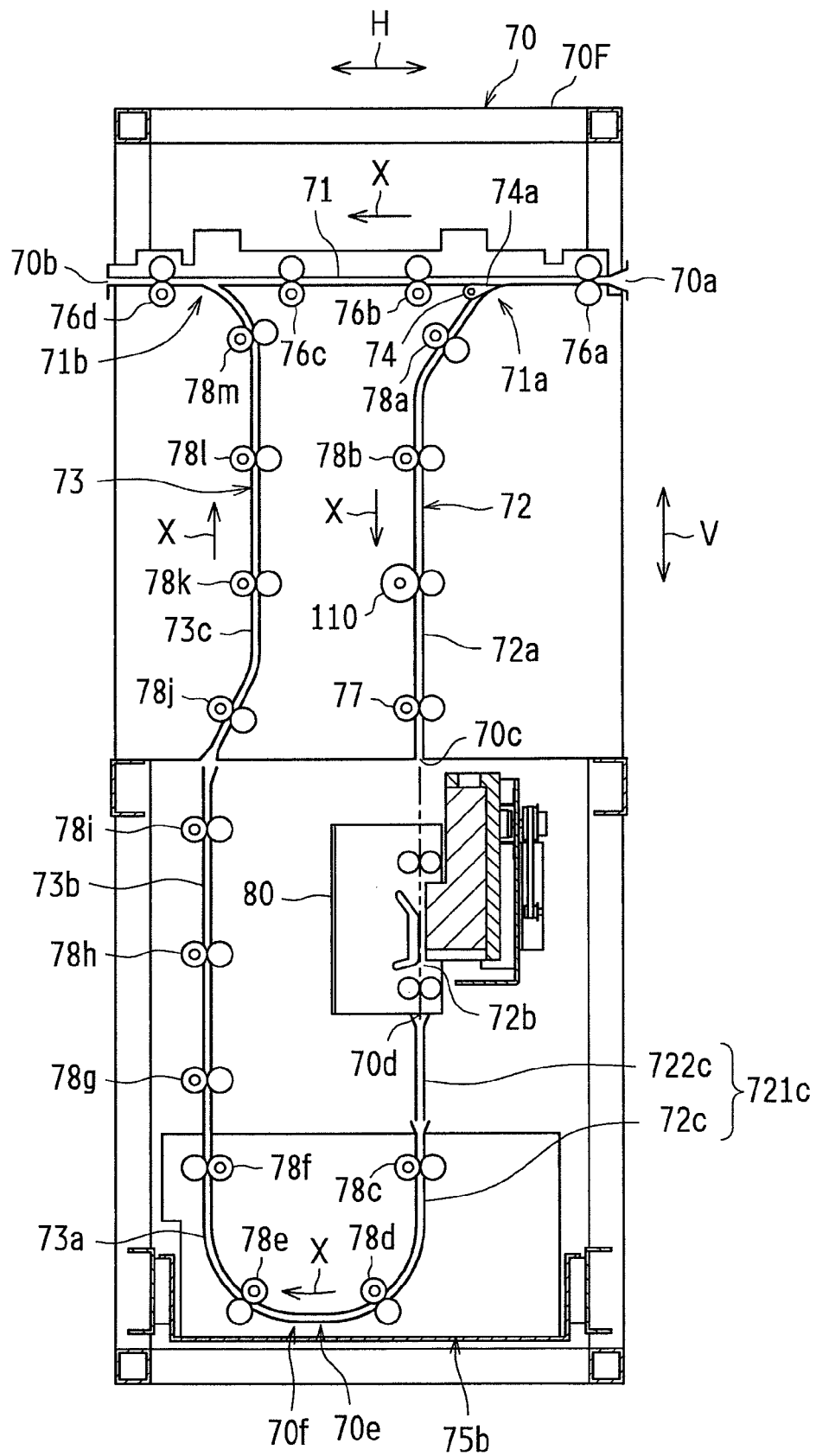
FIG. 4 is a front view showing the schematic configuration of an example in which a fourth sub transport path and a transport unit are provided instead of a stacker unit in the second relay unit.

FIG. 4 is a front view showing the schematic configuration of an example in which the fourth sub transport path 73 and the transport unit 75b are provided instead of the stacker unit 75a in the second relay unit 70.

As shown in FIG. 4, in the case where the second relay unit 70 is provided with the fourth sub transport path 73 and the transport unit 75b, the fourth sub transport path 73 is configured so as to be connected to the third sub transport path 72, and to be merged with the second main transport path 71 at a second merging portion 71b, which is on the downstream side in the transport direction X of the second branching portion 71a. In this case, when performing the calibration process on the image forming portion 3 by forming the test pattern 41, the calibration recording sheet 40 can be returned to the second main transport path 71 after the test pattern 41 on the calibration recording sheet 40 is read by the reading portion 80.

Specifically, the link transport path 721c is configured by the relay transport path 722c and a downstream reading transport path 72c. The relay transport path 722c has one end connected to the carry-out port 70d of the reading portion 80 main body, and extends in the vertical direction V. The downstream reading transport path 72c has one end connected to the other end of the relay transport path 722c, and the other end positioned at a lower end portion 70e of the transport unit 75b. The downstream reading transport path 72c extends so as to be curved in the horizontal direction (the direction H shown in FIG. 4), which forms an angle of 90° (or substantially 90°) with the vertical direction V, between the carry-out port 70d and the lower end portion 70e.

The fourth sub transport path 73 is provided with an intermediate transport path 73b, an upstream transport path 73a that is disposed on the upstream side in the transport direction X of the intermediate transport path 73b, and a downstream transport path 73c that is disposed on the downstream side in the transport direction X of the intermediate transport path 73b.

The upstream transport path 73a has one end positioned at a lower end portion 70f of the transport unit 75b and the other end connected to one end of the intermediate transport path 73b, and extends so as to be curved in the vertical direction V, which forms an angle of 90° (or substantially 90°) with the horizontal direction (the direction H shown in FIG. 4), between the lower end portion 70f and one end of the intermediate transport path 73b.

The intermediate transport path 73b has one end connected to the other end of the upstream transport path 73a, and the other end connected to one end of the downstream transport path 73c. The intermediate transport path 73b extends in the vertical direction V between the other end of the upstream transport path 73a and one end of the downstream transport path 73c.

The downstream transport path 73c has one end connected to the other end of the intermediate transport path 73b, and the other end facing the second merging portion 71b. The downstream transport path 73c extends in the vertical direction V while making a detour by a preset distance toward the upstream reading transport path 72a, and has a point where the downstream transport path 73c is curved toward the second merging portion 71b in the horizontal direction (the direction H shown in FIG. 4), which forms an angle of 90° (or substantially 90°) with the vertical direction V.

In this example, the second relay unit 70 is further provided with a plurality of sub transport roller pairs 78c to 78m.

The sub transport roller pairs 78c and 78d are arranged between the reading portion 80 and the lower end portion 70e on the third sub transport path 72. The sub transport roller pairs 78e to 78m are arranged between the lower end portion 70f and the second merging portion 71b on the fourth sub transport path 73.

Note that, in the transport unit 75b, the downstream reading transport path 72c and the upstream transport path 73a form a U-shaped transport path on which the recording sheet P transported in the transport direction X is turned up at the lowest point (the lower end portions 70e and 70f).

Discharge Unit

As shown in FIG. 1, the discharge unit 90 is attachable to and removable from the second relay unit 70, and is provided with a discharge portion 93 that discharges the recording sheet P from the second relay unit 70 to the outside, and a discharging accommodating portion 95 that accommodates the recording sheet P discharged by the discharge portion 93.

Specifically, the discharge portion 93 is provided with a third main transport path 91, one or a plurality of (one, in this example) fifth sub transport path 92, a third gate portion 94, and a frame member 90F that supports the constituent members of the discharge portion 93. The discharging accommodating portion 95 is provided with a plurality of discharge trays (first and second discharge trays 95a and 95b, in this example).

The third main transport path 91 is configured such that the recording sheet P carried out from the second relay unit 70 is transported in the transport direction X and carried to the outside.

Specifically, the third main transport path 91 has one end connected to a carry-in port 90a of the discharge unit 90 main body and the other end connected to one carry-out port (hereinafter, referred to as a "first carry-out port") 90b that carries out the recording sheet P, and extends in the horizontal direction H between the carry-in port 90a and the first carry-out port 90b. The carry-in port 90a is disposed at one end in the horizontal direction H of the discharge unit 90 main body so as to oppose the carry-out port 70b of the second relay unit 70 main body, and is a carry-in port at which the recording sheet P carried out from the carry-out port 70b is carried in.

The fifth sub transport path 92 is configured so as to be branched from the third main transport path 91 at a third branching portion 91a.

Specifically, the fifth sub transport path 92 has one end facing the third branching portion 91a and the other end connected to the other carry-out port (hereinafter, referred to as a "second carry-out port") 90c from which the recording sheet P is carried out below the first carry-out port 90b in the vertical direction V. The fifth sub transport path 92 extends so as to be curved in the vertical direction (the direction V shown in FIG. 1), which forms an angle of 90° (or substantially 90°) with the horizontal direction H, between the third branching portion 91a and the second carry-out port 90c.

The third gate portion 94 is disposed near the third branching portion 91a, and is configured so as to switch the third main transport path 91 and the fifth sub transport path 92 as a transport path on which the recording sheet P from the second relay unit 70 is to be transported.

Specifically, the third gate portion 94 is provided with a third branching claw 94a. The third branching claw 94a is configured so as to be in a first posture where the recording sheet P from the carry-out port 70b of the second relay unit 70 main body is guided toward the third main transport path 91 and in a second posture (the posture shown in FIG. 1) where the recording sheet P from the carry-out port 70b of the second relay unit 70 main body is guided toward the fifth sub transport path 92. The third gate portion 94 is electrically connected to the control portion 200 (see FIG. 10, described later), and switches the first posture and the second posture in response to an instruction signal from the control portion 200.

The first discharge tray 95a accommodates the recording sheet P discharged from the first carry-out port 90b of the discharge unit 90 main body. The second discharge tray 95b accommodates the recording sheet P discharged from the second carry-out port 90c of the discharge unit 90 main body.

In the first embodiment, the discharge unit 90 is provided with a plurality of main transport roller pairs 96a to 96c and a plurality of sub transport roller pairs 98a and 98b.

The main transport roller pairs 96a and 96b are arranged between the carry-in port 90a and the third branching portion 91a on the third main transport path 91. The main transport roller pair 96c is disposed between the third branching portion 91a and the first carry-out port 90b on the third main transport path 91.

The sub transport roller pairs 98a and 98b are arranged between the third branching portion 91a and the second carry-out port 90c on the fifth sub transport path 92.

For example, in the case where the second relay unit 70 is provided with the stacker unit 75a (see FIGS. 1 and 3), the discharge unit 90 discharges only the ordinary recording sheet P among the ordinary recording sheet P and the calibration recording sheet 40 because the calibration recording sheet 40 is accommodated in the stacker unit 75a in the second relay unit 70. On the other hand, for example, in the case where the second relay unit 70 is provided with the fourth sub transport path 73 and the transport unit 75b (see FIG. 4), the discharge unit 90 discharges both the ordinary recording sheet P and the calibration recording sheet 40 because the calibration recording sheet 40 is returned to the second main transport path 71 in the second relay unit 70.

The image forming apparatus 100 described above operates as follows. Note that, in the following operation, the ordinary recording sheet is discharged to the first discharge tray 95a, and, in the case where the second relay unit 70 is provided with the fourth sub transport path 73 and the transport unit 75b, the calibration recording sheet 40 is discharged to the second discharge tray 95b.

Image Formation not Requiring the Coating Process Nor the Calibration Process

If an ordinary image is formed on the recording sheet P and the coating process is not to be performed, the first branching claw 54a, the second branching claw 74a, and the third branching claw 94a are switched to the first posture, and, thus, the ordinary recording sheet from the carry-out port 1a of the image forming apparatus main body 1 is transported in order of the first main transport path 51→the second main transport path 71→the third main transport path 91 (the shortest route), and is discharged to the first discharge tray 95a.

Image Formation Requiring the Coating Process but not Requiring the Calibration Process If an ordinary image is formed on the recording sheet P and the coating process is to be performed, the first branching claw 54a is switched to the second posture and the second branching claw 74a and the third branching claw 94a are switched to the first posture, and, thus, the ordinary recording sheet from the carry-out port 1a of the image forming apparatus main body 1 is transported in order of the first main transport path 51→the first sub transport path 52→the first coating portion 60a→the transport unit 55→the second sub transport path 53→the second coating portion 60b→the second sub transport path 53→the first main transport path 51→the second main transport path 71→the third main transport path 91, and is discharged to the first discharge tray 95a.

Image Formation not Requiring the Coating Process but Requiring the Calibration Process, Accommodated in the Accommodation Container If the test pattern 41 is formed on the recording sheet P, the coating process is not to be performed, and the second relay unit 70 is provided with the stacker unit 75a (see FIGS. 1 and 3), the second branching claw 74a is switched to the second posture and the first branching claw 54a is switched to the first posture, and, thus, the calibration recording sheet 40 from the carry-out port 1a of the image forming apparatus main body 1 is transported in order of the first main transport path 51→the second main transport path 71→the third sub transport path 72→the reading portion 80→the stacker unit 75a, and is accommodated in the accommodation container 751.

Image Formation not Requiring the Coating Process but Requiring the Calibration Process, Discharged to the Discharge Tray If the test pattern 41 is formed on the recording sheet P, the coating process is not to be performed, and the second relay unit 70 is provided with the fourth sub transport path 73 and the transport unit 75b (see FIG. 4), the second branching claw 74a and the third branching claw 94a are switched to the second posture and the first branching claw 54a is switched to the first posture, and, thus, the calibration recording sheet 40 from the carry-out port 1a of the image forming apparatus main body 1 is transported in order of the first main transport path 51→the second main transport path 71→the third sub transport path 72→the reading portion 80→the transport unit 75b→the fourth sub transport path 73→the second main transport path 71→the third main transport path 91→the fifth sub transport path 92, and is discharged to the second discharge tray 95b.

Image Formation Requiring Both the Coating Process and the Calibration Process, Accommodated in the Accommodation Container If the test pattern 41 is formed on the recording sheet P, the coating process is to be performed, and the second relay unit 70 is provided with the stacker unit 75a (see FIGS. 1 and 3), the first branching claw 54a and the second branching claw 74a are switched to the second posture, and, thus, the calibration recording sheet 40 from the carry-out port 1a of the image forming apparatus main body 1 is transported in order of the first main transport path 51→the first sub transport path 52→the first coating portion 60a→the transport unit 55→the second sub transport path 53→the second coating portion 60b→the second sub transport path 53→the first main transport path 51→the second main transport path 71→the third sub transport path 72→the reading portion 80→the stacker unit 75a, and is accommodated in the accommodation container 751.

Image Formation Requiring Both the Coating Process and the Calibration Process, Discharged to the Discharge Tray If the test pattern 41 is formed on the recording sheet P, the coating process is to be performed, and the second relay unit 70 is provided with the fourth sub transport path 73 and the transport unit 75b (see FIG. 4), the first branching claw 54a, the second branching claw 74a, and the third branching claw 94a are switched to the second posture, and, thus, the calibration recording sheet 40 from the carry-out port 1a of the image forming apparatus main body 1 is transported in order of the first main transport path 51→the first sub transport path 52→the first coating portion 60a→the transport unit 55→the second sub transport path 53→the second coating portion 60b→the second sub transport path 53→the first main transport path 51→the second main transport path 71→the third sub transport path 72→the reading portion 80→the transport unit 75b→the fourth sub transport path 73→the second main transport path 71→the third main transport path 91→the fifth sub transport path 92 (the longest route), and is discharged to the second discharge tray 95b.

Image Forming Apparatus Main Body

Next, the image forming apparatus main body 1 of the image forming apparatus 100 according to the first embodiment will be described below in detail.

Figure 5:
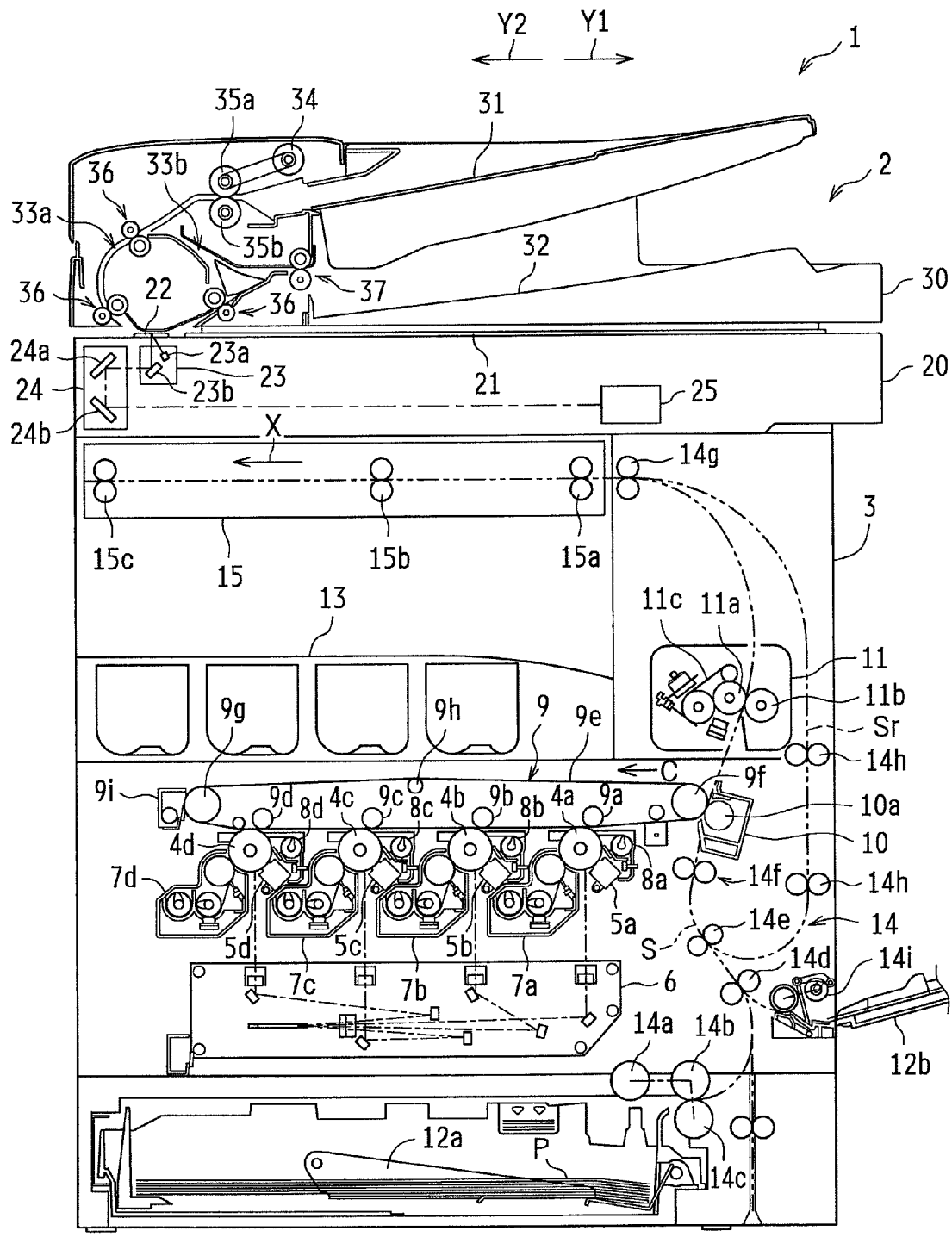
FIG. 5 is a front view showing the schematic configuration of an image forming apparatus main body of the image forming apparatus shown in FIG. 1.

FIG. 5 is a front view showing the schematic configuration of the image forming apparatus main body 1 of the image forming apparatus 100 shown in FIG. 1.

The image forming apparatus main body 1 is, for example, a multifunction peripheral having a scanner function, a facsimile function, and a printer function. The image forming apparatus main body 1 is provided with the image reading device 2 that reads an image on a document and the image forming portion 3 that forms an image based on data of the image read by the image reading device 2.

The image reading device 2 is provided with an image reading portion 20 and a document feeding portion 30 that is attached in an openable and closable manner to the image reading portion 20.

The image reading portion 20 is provided with a flatbed glass 21, a document reading glass 22, a light source unit 23, a mirror unit 24, and an imaging unit 25.

The light source unit 23 is provided with a light source 23a that illuminates a document with light and a mirror 23b that guides light reflected by the document to the mirror unit 24. The light source unit 23 is configured so as to move in a sub-scanning direction Y1.

The mirror unit 24 has a mirror 24a and a mirror 24b.

The document feeding portion 30 is provided with a document tray 31 on which a document is placed, a discharge tray 32 to which a document is discharged, a transport path 33a that is for transporting a document placed on the document tray 31 to the discharge tray 32, and a transport path 33b that is for returning a document that has passed through a reading position to the upstream side of the reading position.

A pickup roller 34 that introduces the documents placed on the document tray 31 sequentially from the top into the transport path 33a of the document feeding portion 30 is disposed near the document tray 31.

A stacking roller 35a and a separation roller 35b that are for preventing a plurality of overlapping documents to be simultaneously transported to the transport path 33a (multi-feeding) are arranged near the pickup roller 34.

Furthermore, transport rollers 36 and discharge rollers 37 are arranged on the transport path 33a.

In the document feeding portion 30, documents placed on the document tray 31 are transported by the pickup roller 34 from the document tray 31 in a transport direction Y2. Then, the documents transported from the document tray 31 are separated by the stacking roller 35a and the separation roller 35b, so that the documents are transported sheet by sheet to the transport path 33a. Each of the documents is transported via the transport rollers 36 and passes through the reading position. Then, the image reading portion 20 reads an image on a surface of the document that passes through the reading position.

The image forming portion 3 is provided with photosensitive drums 4a, 4b, 4c, and 4d, charging units 5a, 5b, 5c, and 5d, an exposure device 6, development devices 7a, 7b, 7c, and 7d, cleaner devices 8a, 8b, 8c, and 8d, an intermediate transfer belt device 9 having intermediate transfer rollers 9a, 9b, 9c, and 9d, a secondary transfer device 10, a fixing device 11, a paper feed tray 12a and a manual paper feed tray 12b that function as feeder portions, a discharge tray 13 that functions as a discharge portion, a sheet transport device 14, and a relay transport unit 15. The symbols a to d respectively correspond to the colors black (K), cyan (C), magenta (M), and yellow (Y). In the image forming portion 3, image forming stations corresponding to the respective colors are configured by the photosensitive drums 4a to 4d, the charging units 5a to 5d, the development devices 7a to 7d, the cleaner devices 8a to 8d, and the intermediate transfer rollers 9a to 9d.

The intermediate transfer belt device 9 is disposed above the photosensitive drums 4a, 4b, 4c, and 4d, and is provided with an intermediate transfer belt 9e, an intermediate transfer belt drive roller 9f, an idler roller 9g, a tension roller 9h, and an intermediate transfer belt cleaning device 9i.

The intermediate transfer rollers 9a, 9b, 9c, and 9d, the intermediate transfer belt drive roller 9f, the idler roller 9g, and the tension roller 9h support the intermediate transfer belt 9e in a tensioned state, and move the intermediate transfer belt 9e in a circumferential direction C.

The secondary transfer device 10 has a transfer roller 10a that is in contact with the intermediate transfer belt 9e.

In the image forming apparatus main body 1, toner images formed on the surfaces of the photosensitive drums 4a, 4b, 4c, and 4d are superimposed on the intermediate transfer belt 9e, forming a toner image with colors according to the image data. The thus superimposed toner images of the respective colors are transported along with the intermediate transfer belt 9e, and transferred to the recording sheet P by the secondary transfer device 10.

The fixing device 11 has a heat roller 11a and a pressure roller 11b between which the recording sheet P is transported. Furthermore, the fixing device 11 is provided with an external heat belt 11c that heats the heat roller 11a from the outside.

The paper feed tray 12a is a tray in which the recording sheet P is to be accommodated, and the manual paper feed tray 12b is a tray on which the recording sheet P is placed. The discharge tray 13 is a tray on which the recording sheet P after printing is to be placed face down in the case where the relay transport unit 15 has been detached. The relay transport unit 15 is attachable to and removable from the image forming apparatus main body 1. The relay transport unit 15 has a plurality of transport rollers 15a, 15b, and 15c that are sequentially arranged in the transport direction X, and is configured such that the recording sheet P discharged from discharge rollers 14g is transported to the first relay unit 50. The recording sheet P discharged to the relay transport unit 15 is transported by the transport rollers 15a, 15b, and 15c to the first relay unit 50.

The sheet transport device 14 is provided such that the recording sheet P can be transported from the paper feed tray 12a or the manual paper feed tray 12b via the secondary transfer device 10 and the fixing device 11 to the discharge tray 13. In the sheet transport device 14, a pickup roller 14a, a stacking roller 14b, a separation roller 14c, transport rollers 14d, a pre-registration roller pair 14e, a registration roller pair 14f, and the discharge rollers 14g are arranged along a sheet transport path S from the paper feed tray 12a.

Furthermore, a pickup roller 14i that feeds the recording sheets P from the manual paper feed tray 12b sheet by sheet to the sheet transport path S is disposed near the manual paper feed tray 12b.

In the first embodiment, it is assumed that the transport speed of the recording sheet P when the image formation is performed (hereinafter, referred to as a "processing speed")

is, specifically, 330 mm/s. Furthermore, it is assumed that the transport speed of the recording sheet P after the upstream edge in the transport direction X (trailing edge) of the recording sheet P has passed through the fixing device 11 (specifically, after the trailing edge of the recording sheet P is detected by a detection sensor (not shown) that is disposed near a fixing nip portion on the downstream side in the transport direction X of the fixing nip portion) (hereinafter, referred to simply as a "transport speed") is higher than the processing speed, and is, specifically, 627 mm/s. That is to say, in the image forming apparatus 100, the recording sheet P that has passed through the fixing device 11 is transported at 627 mm/s through the relay transport unit 15, the first main transport path 51, the second main transport path 71, and the discharge unit 90.

Note that a monochrome image may be formed using at least one of the four image forming stations, and transferred to the intermediate transfer belt 9e of the intermediate transfer belt device 9. The monochrome image is also transferred from the intermediate transfer belt 9e to the recording sheet P and fixed to the recording sheet P as in the case of the color image.

Furthermore, when forming an image not only on the front face of the recording sheet P but on both faces, after an image on the front face of the recording sheet P is fixed by the fixing device 11, the discharge rollers 14g are stopped and then rotated in reverse when the recording sheet P is being transported by the discharge rollers 14g on the sheet transport path S, the recording sheet P is passed through transport rollers 14h to a front-back reverse path Sr where the front and the back of the recording sheet P are reversed, and then the recording sheet P is guided again to the registration roller pair 14f. Subsequently, as in the case of the front face of the recording sheet P, a toner image is transferred and fixed to the back face of the recording sheet P, and the recording sheet P is discharged to the discharge tray 13 or the relay transport unit 15.

In the image forming apparatus main body 1, when performing ordinary image formation, an image read by the image reading device 2 is formed by the image forming portion 3 on the recording sheet P. Then, the recording sheet P on which an ordinary image has been formed (the ordinary recording sheet) is fed via the relay transport unit 15 to the first relay unit 50.

Furthermore, in the image forming apparatus main body 1, when performing the calibration process, the test pattern 41 (see FIG. 8) is formed by the image forming portion 3 on the recording sheet P. Then, the recording sheet P on which the test pattern 41 has been formed (the calibration recording sheet 40) is fed via the relay transport unit 15 to the first relay unit 50.

Regarding the Coating Portion

Next, the coating portions 60 (60a and 60b) that cause a transparent resin material F2 (see FIG. 6A described later) to be attached to the recording sheet P having the image formed will be described below.

Figure 6A:
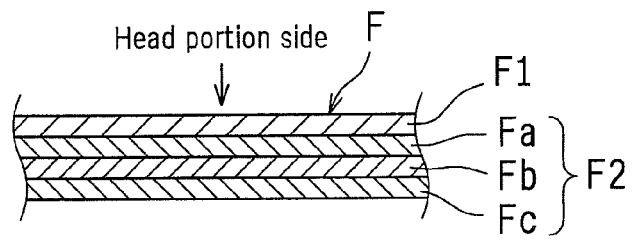
FIG. 6A is a cross-sectional view showing the schematic configuration of a coating film that is provided in the pair of coating portions.
Figure 6B:
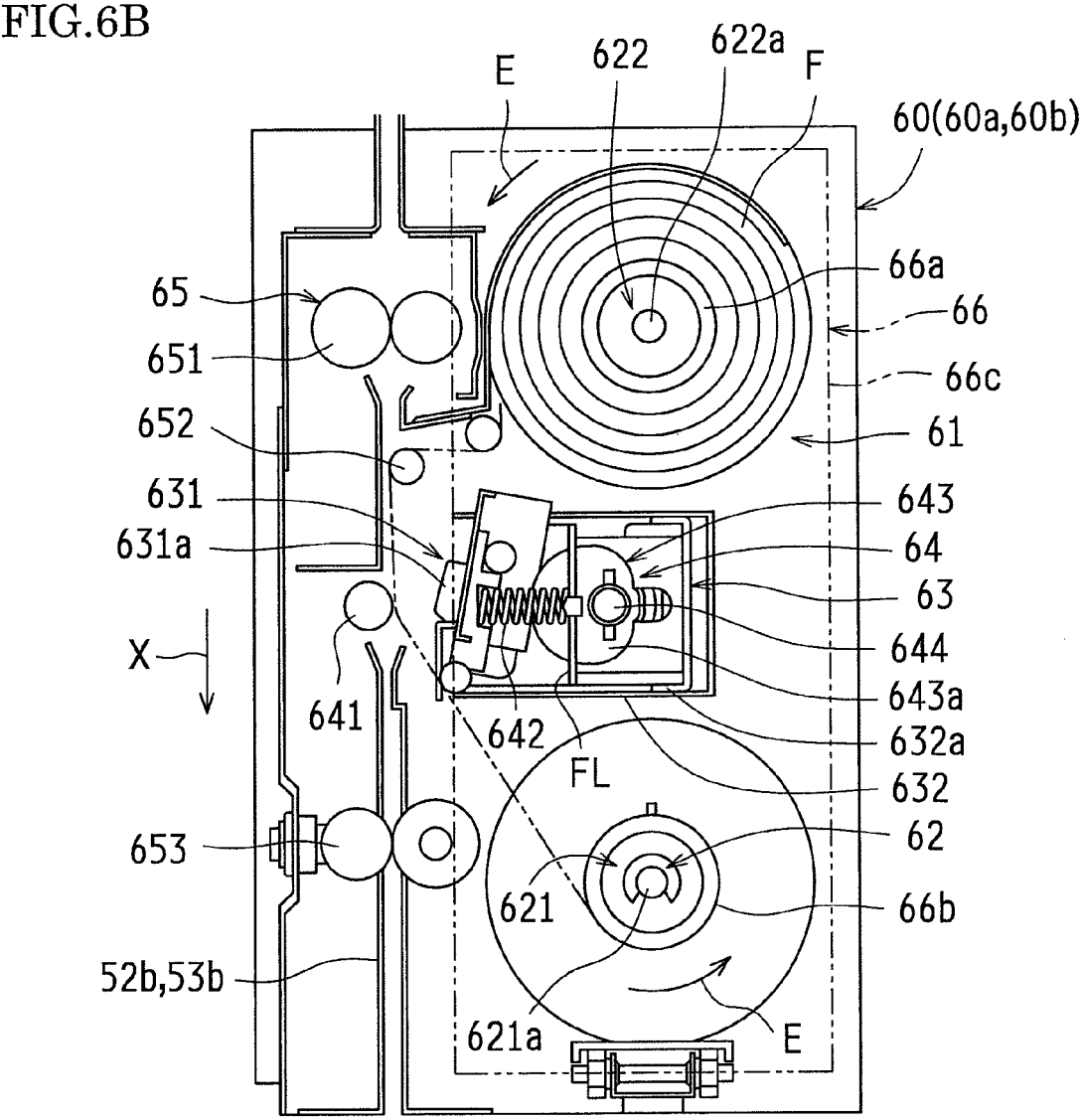
FIG. 6B is a front view showing the schematic configuration of the pair of coating portions.

FIGS. 6A and 6B are views for illustrating the pair of coating portions 60a and 60b shown in FIGS. 1 and 2, wherein FIG. 6A is a cross-sectional view showing the schematic configuration of a coating film F that is provided in the pair of coating portions 60a and 60b, and FIG. 6B is a front view showing the schematic configuration of the pair of coating portions 60a and 60b. Note that, since the first coating portion 60a and the second coating portion 60b have substantially the same configuration except one of them is turned over in the transport direction X (specifically, turned upside down), the configuration of the first coating portion 60a is shown as a representative example, and the second coating portion 60b has been omitted in FIG. 6B.

The coating portion 60 (60a, 60b) in this example is configured so as to perform a process that causes the transparent resin material F2 to be attached to the recording sheet P having the image formed, where the transparent resin material F2 is attached to the recording sheet P as in a conventional thermal transfer printer (see FIG. 6A).

As shown in FIG. 6A, the transparent resin material F2 includes a release layer Fa that is superimposed on a film base member F1, a coating layer Fb that is superimposed on the release layer Fa, and an adhesive layer Fc that is superimposed on the coating layer Fb. The film base member F1 is a transparent layer made of PET (polyethylene terephthalate) resin having a predetermined thickness (specifically, 4.5 μm). The release layer Fa is a transparent layer made of acrylic resin, and has a function of releasing the coating layer Fb from the film base member F1. The coating layer Fb is a transparent layer made of styrene resin having a predetermined thickness (specifically, 0.5 μm), and functions as a main material for the coating. The adhesive layer Fc is a transparent layer made of polyamide resin (resin material having a melting temperature of 120° C., in this example) having a predetermined thickness (specifically, 0.4 μm to 0.6 μm), and has a function of bonding the coating layer Fb to the recording sheet P at the time of coating.

As shown in FIG. 6B, the coating portion 60 (60a, 60b) is provided with a cartridge accommodating portion 61, a cartridge drive portion 62, a head portion 63, a head drive portion 64, and a transport portion 65.

The cartridge accommodating portion 61 is configured so as to accommodate a film cartridge 66 in a freely attachable and removable manner. For example, the film cartridge 66 is easily attachable to and removable from the cartridge accommodating portion 61 by an operator such as a user.

The film cartridge 66 has a winding reel 66a, a take-up reel 66b, and a cartridge casing 66c.

The winding reel 66a is configured such that the coating film F in which the transparent resin material F2 is attached to the film base member F1 is wound around the winding reel 66a. The take-up reel 66b is configured so as to take up the film base member F1 after the transparent resin material F2 of the coating film F wound around the winding reel 66a has been transferred to the recording sheet P that is being transported on the coating transport path 52b, 53b. The cartridge casing 66c is configured so as to accommodate the winding reel 66a and the take-up reel 66b. It is assumed that the width of the coating film F is larger than the maximum width of the recording sheet P.

The cartridge drive portion 62 is configured such that the take-up reel 66b that takes up the film base member F1 after the transparent resin material F2 has been transferred is rotationally driven in a fixed rotational direction (direction of the arrows E in FIG. 6B) so that the coating film F wound around the winding reel 66a moves in the transport direction X.

Specifically, the cartridge drive portion 62 is provided with a driving rotating portion 621 and an idly rotating portion 622. The driving rotating portion 621 has a driving rotating shaft 621a, and the driving rotating shaft 621a engages with the take-up reel 66b and rotationally drives the take-up reel 66b in the rotational direction E. The idly rotating portion 622 has an idly rotating shaft 622a, and the idly rotating shaft 622a engages with the winding reel 66a and applies a load (a preset constant load) to the rotation of the winding reel 66a in the rotational direction E so as to prevent the winding reel 66a from excessively rotating following the rotation of the take-up reel 66*b*. The driving rotating portion 621 is electrically connected to the control portion 200 (see FIG. 10), and rotates the take-up reel 66*b* in response to an instruction signal from the control portion 200.

The head portion 63 can freely move back and forth between a contact position where the head portion 63 is in contact with the image-formed face of the recording sheet P that is being transported on the coating transport path 52*b*, 53*b* and a withdrawn position where the head portion 63 is away at least from the contact position, and is configured so as to apply heat to the film base member F1 side of the coating film F when the head portion 63 is positioned at the contact position. It is assumed that the width of the head portion 63 is larger than or equal to the width of the coating film F.

Specifically, the head portion 63 has a heater portion 631 and a heater support portion 632.

The heater portion 631 is provided with an electrothermal heater 631*a* (see FIG. 10) that applies heat to the film base member F1 side of the coating film F. The heater support portion 632 is provided with a sliding mechanism 632*a* that supports the heater portion 631 and freely slides between the contact position and the withdrawn position.

The heater 631*a* is connected to the control portion 200 (see FIG. 10), and generates heat through the application of electricity in response to an instruction signal from the control portion 200.

The head drive portion 64 is provided with a pressure member 641, a biasing member 642, a cam mechanism 643, and a cam drive portion 644.

The pressure member 641 is positioned at a position corresponding to the heater portion 631, on the coating transport path 52*b*, 53*b* on the side opposite the head portion 63. The pressure member 641 in this example is a pressure roller, and idly rotates following the transport in the transport direction X of the recording sheet P that is being transported on the coating transport path 52*b*, 53*b* and pressed between the pressure member 641 and the heater portion 631. The biasing member 642 biases the heater support portion 632 toward the contact position (the pressure member 641). The biasing member 642 in this example is a coil spring, and has one end connected to the heater support portion 632 and the other end connected to a main body frame FL of the coating portion 60 (60*a*, 60*b*). The cam mechanism 643 has a cam portion 643*a*, and the heater support portion 632 biased by the biasing member 642 toward the contact position is moved through the rotation of the cam portion 643*a* to the withdrawn position resisting the biasing force of the biasing member 642. The cam drive portion 644 rotationally drives the cam portion 643*a* in the cam mechanism 643.

The cam drive portion 644 is electrically connected to the control portion 200 (see FIG. 10), and rotates the cam portion 643*a* in response to an instruction signal from the control portion 200.

The transport portion 65 is provided with a coating transport roller pair 651, an overlaying member 652, and a pressure bonding member 653.

The coating transport roller pair 651 is disposed on the upstream side in the transport direction X of the pressure member 641 on the coating transport path 52*b*, 53*b*, and transports the recording sheet P before the coating process. The overlaying member 652 is disposed in the film cartridge 66 between the coating transport roller pair 651 and the pressure member 641 on the coating transport path 52*b*, 53*b*. The overlaying member 652 is an overlaying roller on which the transparent resin material F2-attached face of the coating film F and the image-formed face of the recording sheet P are overlaid on each other. The pressure bonding member 653 is disposed on the downstream side in the transport direction X of the pressure member 641 on the coating transport path 52*b*, 53*b*, and presses from both sides the recording sheet P on which the transparent resin material F2 has been attached by the heater portion 631. Accordingly, the transparent resin material F2 attached to the recording sheet P can be closely attached to the recording sheet P. The pressure bonding member 653 in this example is a pressing roller pair. In the case where the pressure bonding member 653 is a pressing roller pair, the pressure bonding member 653 has not only a close attachment function of causing the transparent resin material F2 attached to the recording sheet P to be closely attached to the recording sheet P but also a transport function of transporting the recording sheet P.

In the first embodiment, the transport speed of the recording sheet P when the coating process is performed (hereinafter, it may be referred to as a "coating process speed") is equal to or lower than the processing speed (specifically, 330 mm/s) of the recording sheet P.

In the coating portion 60 (60*a*, 60*b*) described above, the recording sheet P transported on the coating transport path 52*b*, 53*b* by the coating transport roller pair 651 is overlaid on the coating film F from the winding reel 66*a* by the overlaying member 652 and transported to the pressure member 641. At that time, in the head portion 63, the heater portion 631 is positioned at the contact position by the head drive portion 64, and heat is generated. The film base member F1 side of the coating film F is pressed by the heater portion 631 toward the pressure member 641 against the recording sheet P that has reached the head portion 63, and the transparent resin material F2 of the coating film F is attached (transferred) to the recording sheet P between the pressure member 641 and the heater portion 631. The recording sheet P to which the transparent resin material F2 has been attached is further transported to the pressure bonding member 653 where the transparent resin material F2 is closely attached to the recording sheet P.

In the first embodiment, the transparent resin material F2 is attached to the recording sheet P, but a transparent toner may be attached using the configuration as that of one image forming station of the image forming portion 3 shown in FIG. 5.

Regarding the Attachment and Detachment Configuration of the Coating Portion

In the first embodiment, the first relay unit 50 has a structure in which at least the second coating portion 60*b* that performs the coating process on the back face of the recording sheet P, of the pair of coating portions 60*a* and 60*b*, is attachable to and removable from the first relay unit 50 main body.

Figure 7:
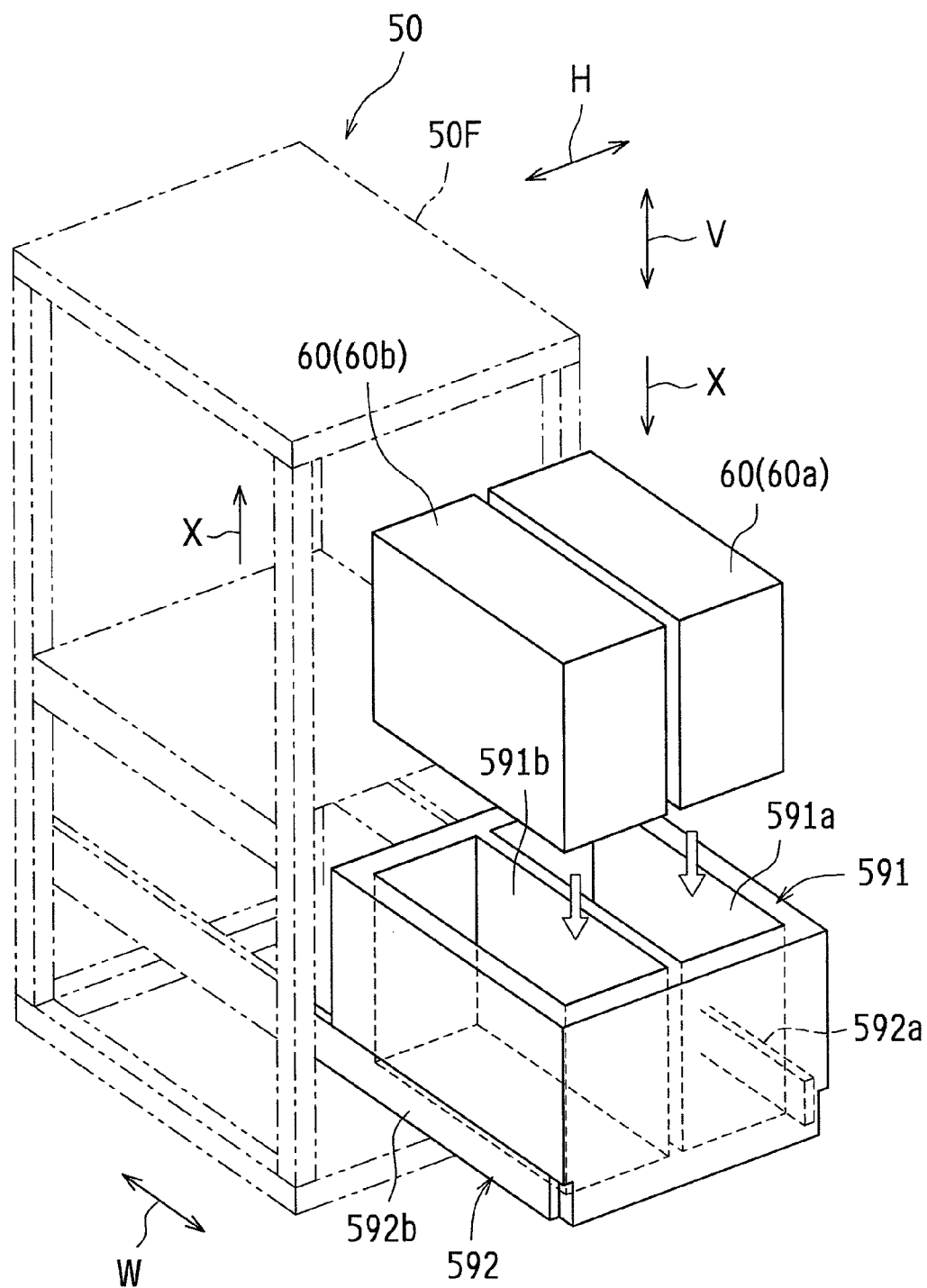
FIG. 7 is a schematic perspective view schematically showing the configuration in which both of the pair of coating portions are attached to and detached from a first relay unit main body.

FIG. 7 is a schematic perspective view schematically showing the configuration in which both of the pair of coating portions 60*a* and 60*b* are attached to and detached from the first relay unit 50 main body.

As shown in FIG. 7, the first relay unit 50 is provided with an accommodation portion 591 and a sliding portion 592.

The accommodation portion 591 is configured so as to accommodate the pair of coating portions 60*a* and 60*b*, and has a first accommodation chamber 591*a* that accommodates the first coating portion 60*a* and a second accommodation chamber 591*b* that accommodates the second coating portion 60*b*. The first coating portion 60*a* is accommodated and held in (specifically, screwed to) the first accommodation chamber 591*a*. The second coating portion 60*b* is accommodated and held in (specifically, screwed to) the second accommodation chamber 591b.

The sliding portion 592 supports the accommodation portion 591 in a manner freely movable back and forth in a width direction W of the calibration recording sheet 40 orthogonal to the transport direction X, and has a first sliding mechanism 592a that supports the accommodation portion 591 on the first coating portion 60a side and a second sliding mechanism 592b that supports the accommodation portion 591 on the second coating portion 60b side. The first sliding mechanism 592a has a pair of sliding members that slide in the width direction W, wherein one of the sliding members is attached to the first coating portion 60a side of the frame member 50F in the first relay unit 50, and the other sliding member is attached to the first coating portion 60a side of the accommodation portion 591. The second sliding mechanism 592b has a pair of sliding members that slide in the width direction W, wherein one of the sliding members is attached to the second coating portion 60b side of the frame member 50F in the first relay unit 50, and the other sliding member is attached to the second coating portion 60b side of the accommodation portion 591.

Regarding the Reading Portion

Next, the reading portion 80 that reads the test pattern 41 on the calibration recording sheet 40 that is being transported on the third sub transport path 72 when performing the calibration process on an image formed by the image forming portion 3 will be described below.

Figure 8:
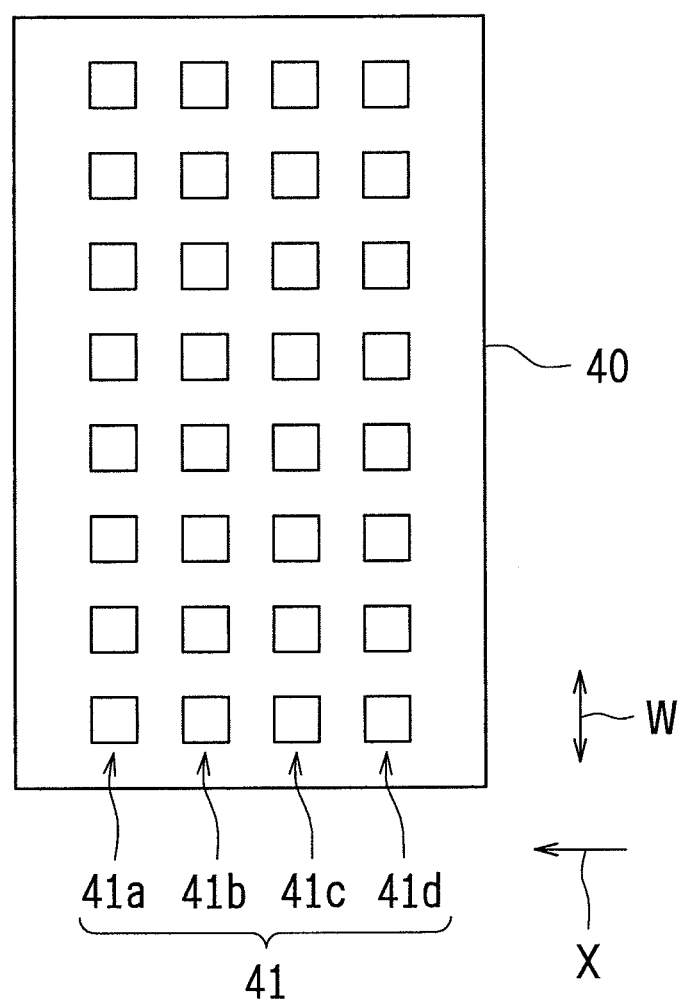
FIG. 8 is a plan view showing an exemplary calibration recording sheet formed by the image forming apparatus main body shown in FIG. 5.

FIG. 8 is a plan view showing an exemplary calibration recording sheet 40 formed by the image forming apparatus main body 1 shown in FIG. 5.

The image forming apparatus 100 forms the test pattern 41 on the recording sheet P using the image forming portion 3 in the image forming apparatus main body 1 in the calibration process mode (when performing the calibration process on the output of image formation), and feeds the calibration recording sheet 40 via the relay transport unit 15 to the first relay unit 50.

Here, the test pattern 41 formed on the calibration recording sheet 40 includes images 41a of black (K) formed at given intervals such that the tone changes in a stepwise manner, images 41b of cyan (C) formed at given intervals such that the tone changes in a stepwise manner, images 41c of magenta (M) formed at given intervals such that the tone changes in a stepwise manner, and images 41d of yellow (Y) formed at given intervals such that the tone changes in a stepwise manner. The images 41a to the images 41d may be, for example, each in the shape of a 2-mm square.

Subsequently, the image forming apparatus 100 performs calibration (adjustment of the image quality) on the output of image formation using the image forming apparatus main body 1 based on reading results received from the reading portion 80 in the first relay unit 50. Note that "adjustment of the image quality" refers to adjustment of a change in image quality and the like of an output image such as a change in darkness or color tone of a printed image. Specifically, adjustment of an image refers to an operation that, in the case where an image (output) actually formed on the recording sheet P does not match a command value of the image forming apparatus main body 1, corrects the command value so as to obtain a desired image. For example, if an attempt is made to form an image of a predetermined tone using the image forming apparatus main body 1 but an image having a tone darker than the predetermined tone is formed, the output is lowered when making a subsequent attempt to form an image of that predetermined tone using the image forming apparatus main body 1, thereby forming an image of the predetermined tone.

Figure 9:
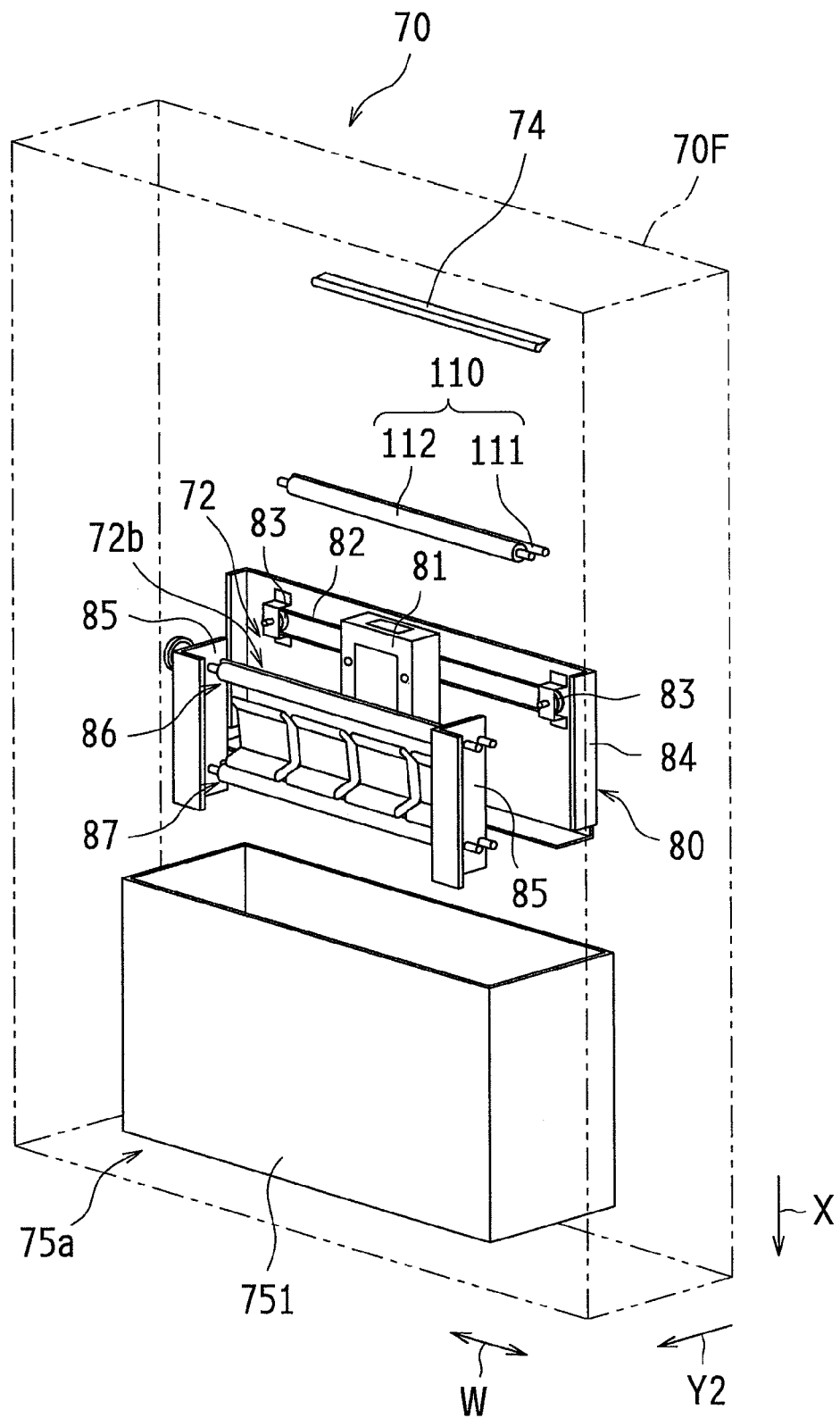
FIG. 9 is a schematic perspective view showing the vicinity of a reading portion of the second relay unit in the image forming apparatus shown in FIG. 1.

FIG. 9 is a schematic perspective view showing the vicinity of the reading portion 80 of the second relay unit 70 in the image forming apparatus 100 shown in FIG. 1. In FIG. 9, the transport paths, the transport roller pairs, and the like have been omitted.

The reading portion 80 is provided with a reading sensor portion 81 that reads the calibration recording sheet 40. The reading sensor portion 81 is, for example, a colorimeter, and is configured so as to read the test pattern 41 formed on the calibration recording sheet 40. For example, the reading results (color measurement results) from the reading sensor portion 81 can be obtained as coordinate values in an L*a*b* color space.

The reading sensor portion 81 is electrically connected to the control portion 200 (see FIG. 10), and reads the test pattern 41 on the calibration recording sheet 40 in response to an instruction signal from the control portion 200.

The reading portion 80 can move back and forth in the width direction W of the calibration recording sheet 40 such that the reading sensor portion 81 can read the test pattern 41 on the calibration recording sheet 40 not only when the test pattern 41 is in the shape of a straight line in the transport direction X but also when the test pattern 41 is in the shape of a plane in the transport direction X and in the width direction W.

Specifically, the reading portion 80 is further provided with a belt 82 that moves the reading sensor portion 81 in the width direction W, a pair of pulleys 83 around which the belt 82 is wound, and a chassis 84 that is provided on one face configured as one side of the frame member 70F.

The belt 82 is wound around the pair of pulleys 83 that are arranged so as to oppose each other in the width direction W. The pulleys 83 are attached to the chassis 84.

The reading portion 80 is further provided with a pair of side plates 85, an upstream transport roller pair 86, and a downstream transport roller pair 87.

The pair of side plates 85 is arranged on the other face configured as the other side opposing said side of the frame member 70F. The upstream transport roller pair 86 and the downstream transport roller pair 87 are arranged between the pair of side plates 85. The upstream transport roller pair 86 is disposed between the pair of side plates 85 on the upstream side in the transport direction X of the reading position of the reading sensor portion 81. The downstream transport roller pair 87 is disposed between the pair of side plates 85 on the downstream side in the transport direction X of the reading position of the reading sensor portion 81. Accordingly, it is possible to easily fix the position of the calibration recording sheet 40 when reading the test pattern 41 on the calibration recording sheet 40 that is being transported on the reading transport path 72b.

The accommodation container 751 provided in the stacker unit 75a is disposed below the reading portion 80, and is disposed at the lower end portion of the frame member 70F. The accommodation container 751 is a top-opened box. The accommodation container 751 is disposed at an end portion on the reading transport path 72b. Accordingly, the calibration recording sheet 40 not necessary for the user can be prevented from being discharged to the discharge portion 93 (see FIG. 1).

Furthermore, the accommodation container 751 is attached to the stacker unit 75a main body in a attachable and removable manner (specifically, in a manner freely movable in the width direction W). The front face of the frame member 70F is provided with an openable and closable door (not shown) at an area corresponding to the stacker unit 75a. Accordingly, the accommodation container 751 can be easily detached from the stacker unit 75a main body, and the calibration recording sheet 40 accommodated in the accommodation container 751 can be easily discarded. Thus, the operation that discards the calibration recording sheet 40 can be made easy.

In the first embodiment, it is assumed that the reading portion 80 reads the test pattern 41 in a state where the calibration recording sheet 40 is stopped, and that the transport speed of the calibration recording sheet 40 other than when the reading sensor portion 81 is reading the test pattern 41 (hereinafter, it may be referred to as a "reading process speed") is equal to the processing speed (specifically, 330 mm/s) of the recording sheet P.

Regarding the Curling Correcting Portion

Next, the curling correcting portion 110 will be described. Note that, since the curling correcting portion 110 disposed in the first relay unit 50 and the curling correcting portion 110 disposed in the second relay unit 70 have the same configuration, in this example, an explanation will be made with reference to the curling correcting portion 110 disposed in the second relay unit 70 shown in FIG. 9.

The curling correcting portion 110 has a function of correcting curling of the recording sheet P curled in the transport direction X. The curling correcting portion 110 is provided with a first roller (specifically, a shaft 111) and a second roller (specifically, a roller 112) having a diameter larger than that of the shaft 111.

For example, the shaft 111 is a shaft made of metal such as stainless steel, and the roller 112 is a silicon sponge roller that is deposed so as to oppose the shaft 111.

Specifically, the shaft 111 has a diameter of 8 mm, and the roller 112 has a diameter (25 mm) approximately three times the diameter of the first shaft 111. The curling correcting portion 110 is configured so as to correct curling of the recording sheet P curled in the transport direction X, by passing the recording sheet P through a point between the shaft 111 and the roller 112 in a state where the shaft 111 and the roller 112 press against each other.

Since the first and the second relay units 50 and 70 are provided with the curling correcting portion 110 in this manner, in the first relay unit 50, the recording sheet P on which curling has been corrected by the curling correcting portion 110 is fed to the coating portions 60, and, thus, the coating process by the coating portions 60 can be stably performed. Furthermore, in the second relay unit 70, the calibration recording sheet 40 on which curling has been corrected by the curling correcting portion 110 is fed to the reading portion 80, and, thus, the precision in reading by the reading portion 80 can be suppressed from deteriorating.

Regarding Control of Transport of the Recording Sheet

Figure 10:
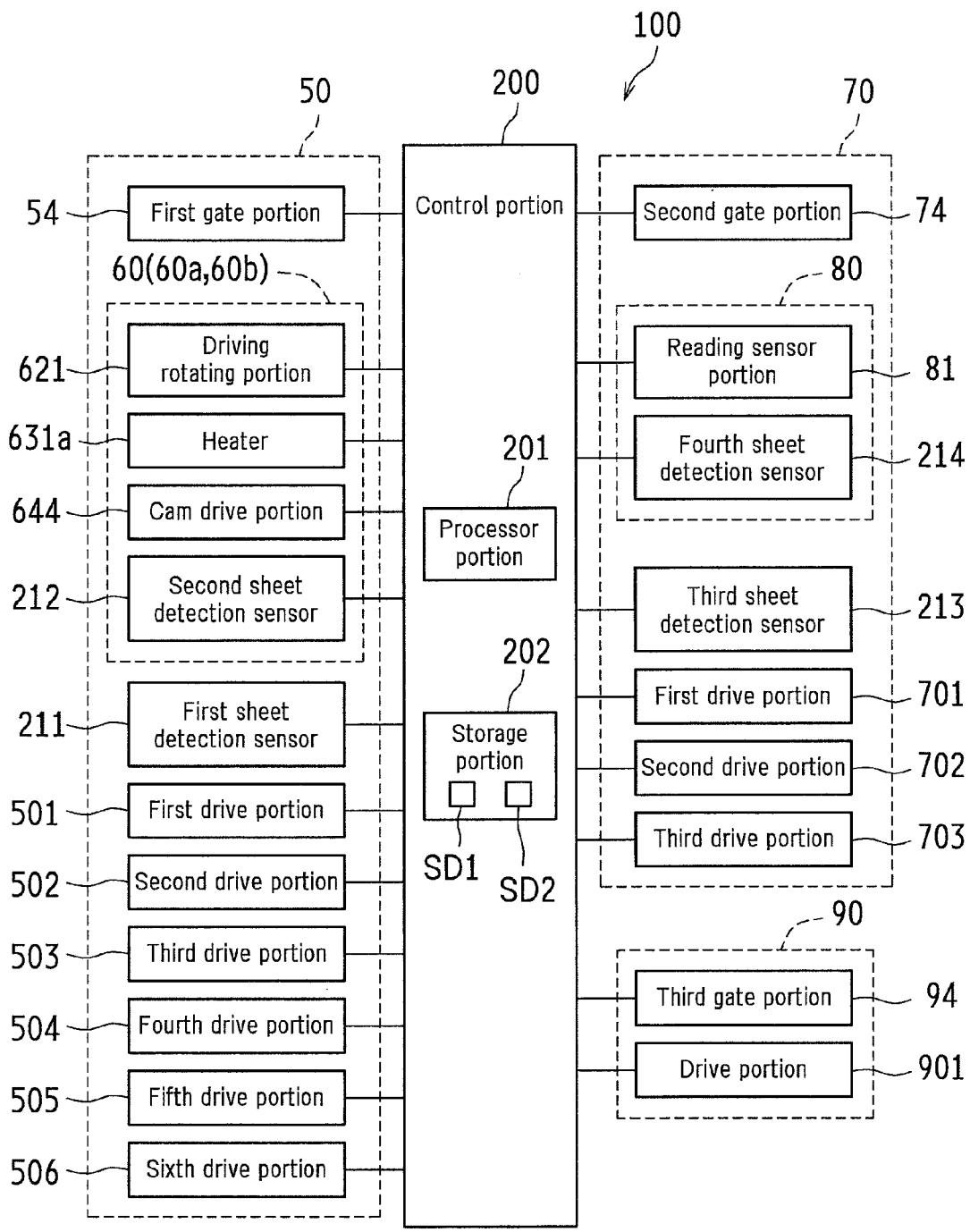
FIG. 10 is a block diagram showing the vicinity of a transport control system of the image forming apparatus shown in FIG. 1.

FIG. 10 is a block diagram showing the vicinity of a transport control system of the image forming apparatus 100 shown in FIG. 1.

As shown in FIG. 10, the image forming apparatus 100 is further provided with the control portion 200. The control portion 200 is provided with a processor portion 201 such as a CPU (central processing unit), and the storage portion 202 that includes a memory such as a ROM (read only memory) and a RAM (random access memory). Specifically, the image forming apparatus 100 is configured such that various constituent elements are controlled by the processor portion 201 of the control portion 200 loading control programs stored in advance in the ROM of the storage portion 202 into the RAM of the storage portion 202 and executing these programs.

The first relay unit 50 in the image forming apparatus 100 is further provided with a first drive portion 501.

The first drive portion 501 is a drive portion (specifically, a drive motor) that drives the main transport roller pairs 56a to 56d. The first drive portion 501 is electrically connected to the control portion 200, and rotates the main transport roller pairs 56a to 56d and transports the recording sheet P at the transport speed (specifically, 627 mm/s) in response to an instruction signal from the control portion 200.

Then, the control portion 200 is configured such that the transport speed of the recording sheet P that is being transported on the first sub transport path 52 is made smaller than the transport speed (specifically, 627 mm/s) of the recording sheet P that is being transported on the first main transport path 51 at least in a period during which the coating process is performed by the first coating portion 60a.

Specifically, the first relay unit 50 in the image forming apparatus 100 is further provided with a second drive portion 502.

The second drive portion 502 is a drive portion (specifically, a drive motor) that drives the sub transport roller pairs 58a and 58b, the curling correcting portion 110, and the first coating registration roller pair 57a. The second drive portion 502 is electrically connected to the control portion 200. In response to an instruction signal from the control portion 200, the second drive portion 502 rotates the sub transport roller pairs 58a and 58b and the curling correcting portion 110, be made small the speed of the recording sheet P from the transport speed and temporarily stops the recording sheet P at the first coating registration roller pair 57a, and, then, rotates the first coating registration roller pair 57a and rotates the sub transport roller pairs 58a and 58b and the curling correcting portion 110 again, thereby transporting the recording sheet P at the coating process speed (specifically, 330 mm/s or lower).

Specifically, the control portion 200 is made small the speed of the recording sheet P to the coating process speed (specifically, 330 mm/s or lower) before the leading edge of the recording sheet P that is being transported on the first sub transport path 52 reaches the first coating portion 60a. More specifically, the control portion 200 is made small the speed of the recording sheet P before the leading edge of the recording sheet P that is being transported on the first sub transport path 52 reaches the first coating registration roller pair 57a, temporarily stops the recording sheet P after the leading edge of the recording sheet P is brought into contact with the first coating registration roller pair 57a, and transports the recording sheet P again, thereby allowing the first coating portion 60a to perform the coating process at the coating process speed.

In the first embodiment, when performing the coating process, the control portion 200 is made small the transport speed of the recording sheet P that is being transported on the first sub transport path 52, after the trailing edge of the recording sheet P that is being transported by the main transport roller pair 56a has passed through the main transport roller pair 56a, which is disposed in closest proximity to the first branching portion 51a on the upstream side in the transport direction X of the first branching portion 51a on the first main transport path 51.

Note that whether or not the trailing edge of the recording sheet P has passed through the main transport roller pair 56a can be detected by a first sheet detection sensor 211 (not shown in FIG. 2, see FIG. 10) such as a reflective-type optical sensor provided near the main transport roller pair 56*a* (specifically, near the main transport roller pair 56*a* on the downstream side in the transport direction X of the main transport roller pair 56*a*). The first sheet detection sensor 211 is electrically connected to the input system of the control portion 200, and can transmit a detection signal to the control portion 200.

In the first embodiment, the first coating portion 60*a* is disposed such that the distance on the transport path between the nip position of the main transport roller pair 56*a* disposed in closest proximity to the first branching portion 51*a* on the upstream side in the transport direction X of the first branching portion 51*a* and the coating process portion that performs the coating process on the recording sheet P is longer than the maximum transport length for transporting the recording sheet P of the maximum size (e.g., A3 size in centimeter-based specification and double letter (WLT) size in inch-based specification). Specifically, the member corresponding to the coating process portion of the first coating portion 60*a* is positioned at the transport roller pair disposed in closest proximity to the first coating portion 60*a* on the upstream side in the transport direction X of the first coating portion 60*a* (the nip position of the first coating registration roller pair 57*a*, in this example).

The first relay unit 50 in the image forming apparatus 100 is further provided with a third drive portion 503.

The third drive portion 503 is a drive portion (specifically, a drive motor) that drives the transport portion 65 in the first coating portion 60*a* (see FIG. 6B). The third drive portion 503 is electrically connected to the control portion 200, and rotates the transport portion 65 and transports the recording sheet P at the coating process speed (specifically, 330 mm/s or lower) in response to an instruction signal from the control portion 200.

The first relay unit 50 in the image forming apparatus 100 is further provided with fourth and fifth drive portions 504 and 505.

The fourth drive portion 504 is a drive portion (specifically, a drive motor) that drives the sub transport roller pairs 58*c* to 58*e* and the second coating registration roller pair 57*b*. The fourth drive portion 504 is electrically connected to the control portion 200. In response to an instruction signal from the control portion 200, the fourth drive portion 504 rotates the sub transport roller pairs 58*c* to 58*e*, is made small the speed of the recording sheet P from the coating process speed (specifically, 330 mm/s or lower) and temporarily stops the recording sheet P at the second coating registration roller pair 57*b*, and, then, rotates the second coating registration roller pair 57*b* and rotates the sub transport roller pairs 58*c* to 58*e* again, thereby transporting the recording sheet P at the coating process speed.

Specifically, the control portion 200 temporarily stops the recording sheet P after the leading edge of the recording sheet P that is being transported on the second sub transport path 53 at the coating process speed (specifically, 330 mm/s or lower) is brought into contact with the second coating registration roller pair 57*b*, and transports the recording sheet P again, thereby allowing the second coating portion 60*b* to perform the coating process at the coating process speed.

The fifth drive portion 505 is a drive portion (specifically, a drive motor) that drives the transport portion 65 in the second coating portion 60*b* (see FIG. 6B). The fifth drive portion 505 is electrically connected to the control portion 200, and rotates the transport portion 65 and transports the recording sheet P at the coating process speed (specifically, 330 mm/s or lower) in response to an instruction signal from the control portion 200.

In the first embodiment, the pair of coating portions 60*a* and 60*b* is arranged such that the distance on the transport path between the coating process portions that perform the coating process on the recording sheet P is longer than the maximum transport length for transporting the recording sheet P of the maximum size (e.g., A3 size in centimeter-based specification and double letter (WLT) size in inch-based specification). Specifically, the member corresponding to the coating process portion of the first coating portion 60*a* is positioned at the nip position of the pressure bonding member 653, and the member corresponding to the coating process portion of the second coating portion 60*b* is positioned at the transport roller pair disposed in closest proximity to the second coating portion 60*b* on the upstream side in the transport direction X of the second coating portion 60*b* (the nip position of the second coating registration roller pair 57*b*, in this example).

In the first embodiment, the control portion 200 is configured such that, after the coating process by the second coating portion 60*b* ends, the transport speed (specifically, 330 mm/s or lower) of the recording sheet P that is being transported on the second sub transport path 53 is returned to the transport speed (specifically, 627 mm/s) of the recording sheet P that is being transported on the first main transport path 51.

Specifically, the first relay unit 50 in the image forming apparatus 100 is further provided with a sixth drive portion 506.

The sixth drive portion 506 is a drive portion (specifically, a drive motor) that drives the sub transport roller pairs 58*f* to 58*i*. The sixth drive portion 506 is electrically connected to the control portion 200. In response to an instruction signal from the control portion 200, the sixth drive portion 506 rotates the sub transport roller pairs 58*f* to 58*i*, increases the speed of the recording sheet P from the coating process speed (specifically, 330 mm/s or lower), thereby transporting the recording sheet P at the transport speed (specifically, 627 mm/s) before the leading edge of the recording sheet P reaches the first main transport path 51.

In the first embodiment, the control portion 200 is configured such that, when returning to the first main transport path 51 the recording sheet P that is being transported on the second sub transport path 53, the transport speed (specifically, 330 mm/s or lower) of the recording sheet P that is being transported on the second sub transport path 53 is returned to the transport speed (specifically, 627 mm/s) of the recording sheet P that is being transported on the first main transport path 51, after the trailing edge of the recording sheet P has passed through the coating process portion (specifically, the pressure bonding member 653) on the second sub transport path 53. Specifically, the control portion 200 is configured such that the speed of the recording sheet P is increased to the transport speed (specifically, 627 mm/s), before the leading edge of the recording sheet P that is being transported on the second sub transport path 53 reaches the first main transport path 51.

Note that whether or not the trailing edge of the recording sheet P has passed through the coating process portion (specifically, the pressure bonding member 653) can be detected by a second sheet detection sensor 212 (not shown in FIGS. 2 and 6B, see FIG. 10) such as a reflective-type optical sensor provided near the pressure bonding member 653 (specifically, near the pressure bonding member 653 on the downstream side in the transport direction X of the pressure bonding member 653). The second sheet detection sensor 212 is electrically connected to the input system of the control portion 200, and can transmit a detection signal to the control portion 200.

Note that, in the first relay unit 50, an electromagnetic clutch (not shown) is provided in a drive transmission system (not shown) disposed between the first to the sixth drive portions 501 to 506 and the roller pairs respectively driven thereby.

The second relay unit 70 in the image forming apparatus 100 is further provided with a first drive portion 701.

The first drive portion 701 is a drive portion (specifically, a drive motor) that drives the main transport roller pairs 76*a* to 76*d*. The first drive portion 701 is electrically connected to the control portion 200, and rotates the main transport roller pairs 76*a* to 76*d* and transports the calibration recording sheet 40 at the transport speed (specifically, 627 mm/s) in response to an instruction signal from the control portion 200.

In the first embodiment, the control portion 200 is configured such that the transport speed of the calibration recording sheet 40 that is being transported on the third sub transport path 72 is made smaller than the transport speed (specifically, 627 mm/s) of the recording sheet P that is being transported on the second main transport path 71 at least when the reading portion 80 is reading the test pattern 41 on the calibration recording sheet 40.

Specifically, the second relay unit 70 in the image forming apparatus 100 is further provided with a second drive portion 702.

The second drive portion 702 is a drive portion (specifically, a drive motor) that drives the sub transport roller pairs 78*a* and 78*b*, the curling correcting portion 110, and the reading registration roller pair 77. The second drive portion 702 is electrically connected to the control portion 200. In response to an instruction signal from the control portion 200, the second drive portion 702 rotates the sub transport roller pairs 78*a* and 78*b* and the curling correcting portion 110, is made small the speed of the calibration recording sheet 40 from the transport speed (specifically, 627 mm/s) and temporarily stops the calibration recording sheet 40 at the reading registration roller pair 77, and, then, rotates the reading registration roller pair 77 and rotates the sub transport roller pairs 78*a* and 78*b* and the curling correcting portion 110 again, thereby transporting the recording sheet P at the reading process speed (specifically, where the sheet is transported at 330 mm/s and stopped in a repeated manner).

Specifically, the control portion 200 is configured such that the speed of the calibration recording sheet 40 is made small to the reading process speed (specifically, where the sheet is transported at 330 mm/s and stopped in a repeated manner), before the leading edge of the calibration recording sheet 40 that is being transported on the third sub transport path 72 reaches the reading portion 80. More specifically, the control portion 200 is made small the speed of the calibration recording sheet 40 before the leading edge of the calibration recording sheet 40 that is being transported on the third sub transport path 72 reaches the reading registration roller pair 77, temporarily stops the calibration recording sheet 40 after the leading edge of the calibration recording sheet 40 is brought into contact with the reading registration roller pair 77, and transports the calibration recording sheet 40 again, thereby allowing the reading portion 80 to read the test pattern 41 at the reading process speed.

In the first embodiment, when reading the test pattern 41 on the calibration recording sheet 40, the control portion 200 is made small the transport speed of the calibration recording sheet 40 that is being transported on the third sub transport path 72, after the trailing edge of the calibration recording sheet 40 that is being transported by the main transport roller pair 76*a* has passed through the main transport roller pair 76*a*, which is disposed in closest proximity to the second branching portion 71*a* on the upstream side in the transport direction X of the second branching portion 71*a* at which the second main transport path 71 is branched into the third sub transport path 72.

Note that whether or not the trailing edge of the calibration recording sheet 40 has passed through the main transport roller pair 76*a* can be detected by a third sheet detection sensor 213 (not shown in FIGS. 3 and 4, see FIG. 10) such as a reflective-type optical sensor provided near the main transport roller pair 76*a* (specifically, near the main transport roller pair 76*a* on the downstream side in the transport direction X of the main transport roller pair 76*a*). The third sheet detection sensor 213 is electrically connected to the input system of the control portion 200, and can transmit a detection signal to the control portion 200.

In the first embodiment, the second coating portion 60*b* and the reading portion 80 are arranged such that the distance on the transport path between the coating process portion that performs the coating process on the recording sheet P in the second coating portion 60*b* and the reading process portion that reads the test pattern 41 in the reading portion 80 is longer than the maximum transport length for transporting the recording sheet P of the maximum size. Specifically, the member corresponding to the coating process portion of the second coating portion 60*b* is positioned at the nip position of the pressure bonding member 653, and the member corresponding to the reading process portion of the reading portion 80 is positioned at the transport roller pair disposed in closest proximity to the reading portion 80 on the upstream side in the transport direction X of the reading portion 80 (the nip position of the reading registration roller pair 77, in this example).

In the first embodiment, in the case where the second relay unit 70 is provided with the fourth sub transport path 73 and the transport unit 75*b* (see FIG. 4), the control portion 200 is configured such that, after the reading of the test pattern 41 on the calibration recording sheet 40 by the reading portion 80 ends, the transport speed (specifically, where the sheet is transported at 330 mm/s and stopped in a repeated manner) of the calibration recording sheet 40 that is being transported on the fourth sub transport path 73 is returned to the transport speed (specifically, 627 mm/s) of the recording sheet P that is being transported on the second main transport path 71.

Specifically, in the case where the second relay unit 70 is provided with the fourth sub transport path 73 and the transport unit 75*b* (see FIG. 4), the second relay unit 70 is further provided with a third drive portion 703.

The third drive portion 703 is a drive portion (specifically, a drive motor) that drives the sub transport roller pairs 78*c* to 78*m*. The third drive portion 703 is electrically connected to the control portion 200. In response to an instruction signal from the control portion 200, the third drive portion 703 rotates the sub transport roller pairs 78*c* to 78*m*, and increases the speed of the recording sheet P from the reading process speed (specifically, where the sheet is transported at 330 mm/s and stopped in a repeated manner), thereby transporting the calibration recording sheet 40 at the transport speed (specifically, 627 mm/s) before the leading edge of the calibration recording sheet 40 reaches the second main transport path 71.

In the first embodiment, the control portion 200 is configured such that, when returning to the second main transport path 71 the calibration recording sheet 40 that is being transported on the fourth sub transport path 73, the transport speed (specifically, where the sheet is transported at 330 mm/s and stopped in a repeated manner) of the calibration recording sheet 40 that is being transported on the fourth sub transport path 73 is returned to the transport speed (specifically, 627 mm/s) of the recording sheet P that is being transported on the second main transport path 71, after the trailing edge of the calibration recording sheet 40 that is being transported by the downstream transport roller pair 87 has passed through the downstream transport roller pair 87, which is disposed in closest proximity to the reading sensor portion 81 on the downstream side in the transport direction X of the reading sensor portion 81 on the fourth sub transport path 73. Specifically, the control portion 200 is configured such that the speed of the recording sheet P is increased to the transport speed (specifically, 627 mm/s) before the leading edge of the calibration recording sheet 40 that is being transported on the fourth sub transport path 73 reaches the second main transport path 71.

Note that whether or not the trailing edge of the calibration recording sheet 40 has passed through the downstream transport roller pair 87 can be detected by a fourth sheet detection sensor 214 (not shown in FIGS. 4 and 9, see FIG. 10) such as a reflective-type optical sensor provided near the downstream transport roller pair 87 (specifically, near the downstream transport roller pair 87 on the downstream side in the transport direction X of the downstream transport roller pair 87). The fourth sheet detection sensor 214 is electrically connected to the input system of the control portion 200, and can transmit a detection signal to the control portion 200.

In the second relay unit 70, an electromagnetic clutch (not shown) is provided in a drive transmission system (not shown) disposed between the first to the third drive portions 701 to 703 and the roller pairs respectively driven thereby.

In the first embodiment, the discharge unit 90 in the image forming apparatus 100 is further provided with a drive portion 901.

The drive portion 901 is a drive portion (specifically, a drive motor) that drives the main transport roller pairs 96*a* to 96*c* and the sub transport roller pairs 98*a* and 98*b*. The drive portion 901 is electrically connected to the control portion 200, and rotates the main transport roller pairs 96*a* to 96*c* and the sub transport roller pairs 98*a* and 98*b* and transports the calibration recording sheet 40 at the transport speed (specifically, 627 mm/s) in response to an instruction signal from the control portion 200.

Regarding the First Embodiment

As described above, in the image forming apparatus 100 according to the first embodiment, the coating portions 60 are arranged on the first sub transport path 52 and the second sub transport path 53. Thus, when performing the coating process, the recording sheet P that has been transported on the first main transport path 51 can be transported to the first sub transport path 52 and the second sub transport path 53, and the recording sheet P can be returned to the first main transport path 51 after the coating process is performed on that recording sheet P during transport on the first sub transport path 52 and the second sub transport path 53. Thus, while the recording sheet P that requires the coating process is transported via the first sub transport path 52 and the second sub transport path 53, the recording sheet P that does not require the coating process can be directly transported on the first main transport path 51. Accordingly, as in the first embodiment, even in the case where the transport speed (specifically, 330 mm/s or lower) of the recording sheet P that requires the coating process is lower than the transport speed (specifically, 627 mm/s) of the recording sheet P that does not require the coating process, the recording sheet P that does not require the coating process is not put on standby until the coating process ends. Thus, the processing time (throughput time) from when transport of the recording sheet P that does not require the coating process starts to when the transport ends after image formation can be effectively prevented from deteriorating. Furthermore, the length of the first main transport path 51 can be suppressed to the extent possible, and the time required to transport the recording sheet P that does not require the coating process can be accordingly shortened. Furthermore, transport of the recording sheet P that does not require the coating process and transport of the recording sheet P that requires the coating process can be separated from each other. Thus, the recording sheet P that requires the coating process can be transported regardless of the transport speed of the recording sheet P that does not require the coating process, that is, while maintaining the transport speed of the recording sheet P that does not require the coating process.

Moreover, since the recording sheet P is returned to the first main transport path 51 after the coating process is performed on that recording sheet P during transport on the first sub transport path 52 and the second sub transport path 53, the recording sheet P that has undergone the coating process and the recording sheet P that does not require the coating process can be transported to the same transport path. For example, the recording sheet P that has undergone the coating process and the recording sheet P that does not require the coating process can be discharged to the same first discharge tray 95*a*. Specifically, requested specifications such as performing the coating process only on the recording sheet P that forms into a front cover after binding or performing the coating process only on the recording sheet P that includes a photographic image can be satisfied. That is to say, the recording sheet P that has undergone the coating process and has been transported on the second sub transport path 53 can be merged with the recording sheet P on the first main transport path 51, so that pages of the recording sheets P in one job can be aligned with each other.

Furthermore, in the first embodiment, since the second sub transport path 53 and the third sub transport path 72 are once returned to the first main transport path 51 and the second main transport path 71 and branched again, the recording sheet P that is being transported on the second sub transport path 53 can be once returned to the first main transport path 51 and the second main transport path 71 and again transported on the third sub transport path 72. Thus, the transport distance of the recording sheet P transported on the second sub transport path 53 and the third sub transport path 72 can be made longer. Accordingly, the coating process by the coating portions 60 and the reading process by the reading portion 80 can be performed with a sufficient transport distance. Although the transport distance of the recording sheet P transported on, of the second sub transport path 53 and the third sub transport path 72, only the second sub transport path 53, only the third sub transport path 72, or both the second sub transport path 53 and the third sub transport path 72 becomes relatively long, the frequency in which, of the coating process and the calibration process, only the coating process, only the calibration process, or both of these processes are performed is generally lower than the frequency in which neither of these processes is performed, and, thus, the influence on the overall processing time (throughput time) imposed by the recording sheet P on which neither the coating process nor the calibration process is performed is typically small.

Furthermore, in the first embodiment, since the coating portions 60 perform the coating process on both faces of the recording sheet P, it is possible to satisfy a request to perform not only a single-sided coating process that performs the coating process on either one face (front face) of the recording sheet P but also a double-sided coating process that performs the coating process on both faces of the recording sheet P. In this case, for example, the configuration may be such that a single-sided coating mode that performs the single-sided coating process and a double-sided coating mode that performs the double-sided coating process are selectively switched. With this configuration, either the single-sided coating process or the double-sided coating process can be performed through simple selection by a user. In the case where a reverse transport path is used where the front and the back of the recording sheet with the image formed thereon on one face (front face) are reversed, transport of the recording sheet to the reverse transport path is performed once in order to perform the coating process on the other face (back face) after performing the coating process on the front face, and transport of the recording sheet to the reverse transport path is performed once more in order to return the positions of the faces of the recording sheet to those before the coating processes, that is, transport is performed twice in total. On the other hand, in the first embodiment, after the double-sided coating process is performed on the recording sheet P, the recording sheet P can be returned to the first main transport path 51 without reversing the recording sheet P, and, thus, transport of the recording sheet P to the first sub transport path 52 and the second sub transport path 53 is performed only once. Accordingly, the overall transport distance of the recording sheet P can be shortened.

Furthermore, in the first embodiment, since the coating portions 60 are configured by the pair of coating portions 60a and 60b that perform the coating process respectively on both faces of the recording sheet P, while the first coating portion 60a, of the pair of coating portions 60a and 60b, can perform the coating process on the front face of the recording sheet P, the second coating portion 60b can perform the coating process on the back face of the recording sheet P.

Furthermore, in the first embodiment, since both the pair of coating portions 60a and 60b are attachable and removable, both the coating portions 60a and 60b are easily attachable and removable, and the efficiency of the operation that causes the coating portions 60a and 60b to be attached and detached can be improved. In particular, since the second coating portion 60b that performs the coating process on the back face of the recording sheet P is attachable and removable, the second coating portion 60b that performs the coating process on the back face of the recording sheet P may be sold as an optional extra in order to allow a user to select whether to perform the coating process on one face of the recording sheet P or to perform the coating process on both faces of the recording sheet P. Even in the case where the second coating portion 60b that performs the coating process on the back face of the recording sheet P is sold as an optional extra, the efficiency of the operation that causes the coating portion 60b sold as an optional extra to be attached and detached can be improved.

Furthermore, in the first embodiment, since the first sub transport path 52 that is branched at the first branching portion 51a, and the second sub transport path 53 that is connected to the first sub transport path 52 and that is merged at the first merging portion 51b, which is on the downstream side in the transport direction X of the first branching portion 51a on the first main transport path 51, are provided, the recording sheet P on the second sub transport path 53 can be returned to the downstream side in the transport direction X of the first branching portion 51a on the first main transport path 51. Accordingly, the transport distance of the recording sheet P, that is, the time required to transport the recording sheet P can be shortened.

Furthermore, in the first embodiment, since the pair of coating portions 60a and 60b is respectively arranged on the first sub transport path 52 and the second sub transport path 53, the coating process can be performed on the recording sheet P that is being transported on the first sub transport path 52, and the coating process can be performed also on the recording sheet P that is being transported on the second sub transport path 53. Accordingly, the coating process can be performed with a sufficient transport distance due to the first sub transport path 52 and the second sub transport path 53. For example, while the first coating portion 60a, of the pair of coating portions 60a and 60b, can perform the coating process on the front face of the recording sheet P that is being transported on the first sub transport path 52, the second coating portion 60b can perform the coating process on the back face of the recording sheet P that is being transported on the second sub transport path 53.

Incidentally, if the second coating portion 60b, of the pair of coating portions 60a and 60b, performs the coating process when the first coating portion 60a is performing the coating process, problems may occur such as creases in a coating film formed on the recording sheet P, which causes the coating performance to deteriorate.

With respect to this point, in the first embodiment, since the pair of coating portions 60a and 60b is arranged such that a distance between coating process portions (specifically, the nip position of the pressure bonding member 653 in the first coating portion 60a, and the nip position of the second coating registration roller pair 57b in the second coating portion 60b) is larger than the maximum transport length for transporting the recording sheet P of the maximum size, it is possible for the second coating portion 60b, of the pair of coating portions 60a and 60b, not to perform the coating process when the first coating portion 60a is performing the coating process. Accordingly, the occurrence of problems such as creases in the coating film formed on the recording sheet P can be suppressed, and, thus, the coating performance in the coating process performed at substantially the same time by both the pair of coating portions 60a and 60b can be maintained.

Furthermore, in the first embodiment, since the first coating portion 60a is disposed such that a distance between the coating process portion that performs the coating process on the recording sheet P (specifically, the nip position of the first coating registration roller pair 57a) and the nip position of the main transport roller pair 56a that is disposed in closest proximity to the first branching portion 51a on the upstream side in the transport direction X of the first branching portion 51a is larger than the maximum transport length for transporting the recording sheet P of the maximum size, the transport speed on the first main transport path 51 can be maintained even in the case where the transport speed on the first main transport path 51 is different from that on the first sub transport path 52 and the second sub transport path 53.

Incidentally, when forming a coating film on a recording sheet (in particular, when causing a transparent resin material to be attached), as the transport speed of the recording sheet increases in a period during which the coating process is performed by the coating portion, problems more frequently occur such as unevenness, gloss loss, and creases in a coating film formed on the recording sheet, which causes the coating performance to deteriorate.

With respect to this point, in the first embodiment, since the transport speed of the recording sheet P that is being transported on the first sub transport path 52 is made smaller than the transport speed (specifically, 627 mm/s) of the recording sheet P that is being transported on the first main transport path 51 at least in a period during which the coating process is performed, the occurrence of problems such as unevenness, gloss loss, and creases in the coating film formed on the recording sheet P can be suppressed, so that the coating performance can be suppressed from deteriorating.

Furthermore, in the first embodiment, since the main transport roller pair 56a is disposed in closest proximity to the first branching portion 51a on the upstream side in the transport direction X of the first branching portion 51a on the first main transport path 51, and, when performing the coating process, the transport speed (specifically, 627 mm/s) is made small after the trailing edge of the recording sheet P that is being transported by the main transport roller pair 56a has passed through the main transport roller pair 56a, the transport speed of the recording sheet P that is being transported on the first sub transport path 52 can be made small without be small the transport speed of the recording sheet P that is being transported on the first main transport path 51. Accordingly, the transport speed of the recording sheet P that is being transported on the first main transport path 51 can be maintained, and, thus, speed control such as deceleration, stoppage, or acceleration of the transport of the recording sheet P that is being transported on the first main transport path 51 does not have to be performed. For example, even in the case where the recording sheet P is stopped at the first coating registration roller pair 57a, the recording sheet P that does not require the coating process transported next on the first main transport path 51 does not have to be stopped, and, thus, extension of the processing time (throughput time) required for that next recording sheet P that does not require the coating process can be avoided.

Furthermore, in the first embodiment, since the curling correcting portion 110 is provided on the upstream side in the transport direction X of the coating portions 60 on the first sub transport path 52 and the second sub transport path 53, the curling correcting portion 110 can correct curling of the recording sheet P before the coating portions 60 perform the coating process. Thus, the coating performance in the coating process performed by the coating portions 60 can be accordingly suppressed from deteriorating.

Furthermore, in the first embodiment, since the coating process is a process that causes the transparent resin material F2 to be attached to the recording sheet P having the image formed, the coating film can be formed on the recording sheet P with relatively simple configuration and at low cost.

Generally, such coating portions are expensive. Thus, in the first embodiment, the first relay unit 50 including the coating portions 60 is attachable to and removable from the image forming apparatus main body 1. In this case, by selling the first relay unit 50 as an optional extra, the coating portions 60 can be provided only to a user who needs the coating portions 60, and an image forming apparatus can be provided at as low cost as possible to a user who does not need the coating portions 60.

Furthermore, in the first embodiment, the frame member 50F of the first relay unit 50 is attachable to and removable from the second relay unit 70 as well as with respect to the image forming apparatus main body 1, and the frame member 70F of the second relay unit 70 is attachable to and removable from the image forming apparatus main body 1 as well as with respect to the first relay unit 50. The frame members 50F and 70F and their transport paths (52a, 52c, 53a, and 53c) and (72a, 72c, 73a, and 73c) of the first and the second relay units 50 and 70 are configured such that the reading portion 80 can be disposed instead of the coating portions 60 (the pair of coating portions 60a and 60b) in the first relay unit 50 and such that the coating portions 60 (the pair of coating portions 60a and 60b) can be arranged instead of the reading portion 80 in the second relay unit 70.

Specifically, the first and the second relay units 50 and 70 have a common frame member 50F, 70F and common transport paths (52a, 52c, 53a, and 53c), (72a, 72c, 73a, and 73c).

Figure 11:
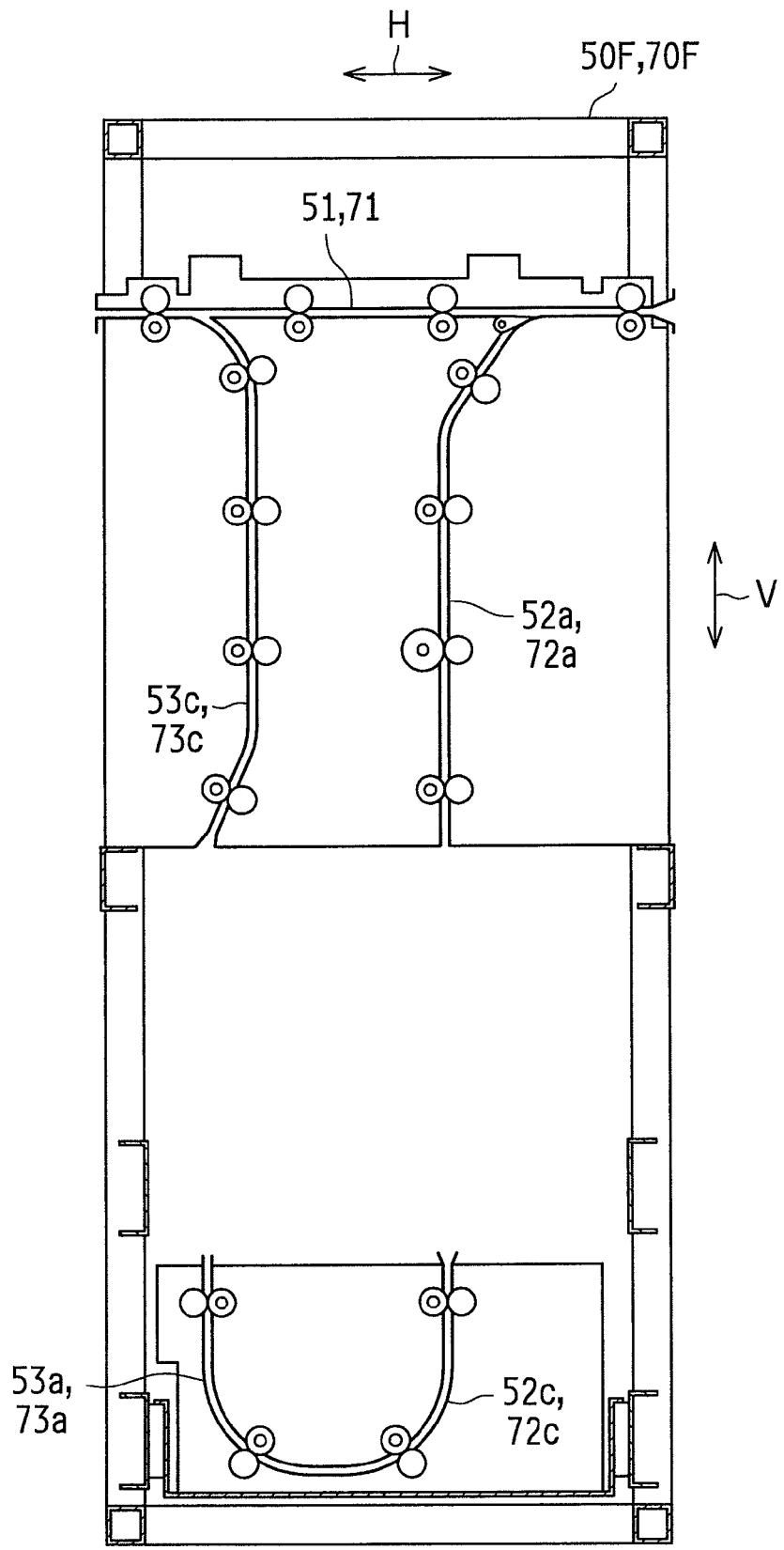
FIG. 11 is a schematic front view showing that the first and the second relay units have a common frame member and common transport paths.

FIG. 11 is a schematic front view showing that the first and the second relay units 50 and 70 have a common frame member 50F, 70F and common transport paths (52a, 52c, 53a, and 53c), (72a, 72c, 73a, and 73c). In FIG. 11, the frame members 50F and 70F and the transport paths (52a, 52c, 53a, and 53c) and (72a, 72c, 73a, and 73c) are common members between the first relay unit 50 and the second relay unit 70, and, thus, these members are shown in one diagram.

Specifically, in the frame member 50F, 70F and the transport paths (52a, 52c, 53a, and 53c), (72a, 72c, 73a, and 73c) shown in FIG. 11, the first relay unit 50 shown in FIG. 2 can be formed by arranging the first coating portion 60a between the transport path 52a, 72a and the transport path 52c, 72c, and arranging the second coating portion 60b between the transport path 53a, 73a and the transport path 53c, 73c. Furthermore, in the frame member 50F, 70F and the transport paths (52a, 52c, 53a, and 53c), (72a, 72c, 73a, and 73c), the second relay unit 70 shown in FIG. 3 can be formed by removing the transport path 52c, 72c, the transport path 53a, 73a, and the transport path 53c, 73c, arranging the discharge transport path 723c, arranging the reading portion 80 between the transport path 52a, 72a and the discharge transport path 723c, and arranging the accommodation container 751 below the discharge transport path 723c. Furthermore, in the frame member 50F, 70F and the transport paths (52a, 52c, 53a, and 53c), (72a, 72c, 73a, and 73c), the second relay unit 70 shown in FIG. 4 can be formed by arranging the reading portion 80 between the transport path 52a, 72a and the transport path 52c, 72c, and arranging straight part of the transport path 52a, 72a (part of the transport path corresponding to the sub transport roller pair 58b, the curling correcting portion 110, and the first coating registration roller pair 57a) between the transport path 53a, 73a and the transport path 53c, 73c.

Since the first and the second relay units 50 and 70 have a common frame member 50F, 70F and common transport paths (52a, 52c, 53a, and 53c), (72a, 72c, 73a, and 73c) in this manner, the reading portion 80 can be attached instead of the coating portions 60 to the first relay unit 50, the coating portions 60 can be attached instead of the reading portion 80 to the second relay unit 70, the second relay unit 70 can be attached to the image forming apparatus main body 1, and the first relay unit 50 can be attached to the second relay unit 70. Accordingly, most constituent elements can be used in common between the first relay unit 50 and the second relay unit 70, and the material cost can be lowered.

Second Embodiment

Figure 12:
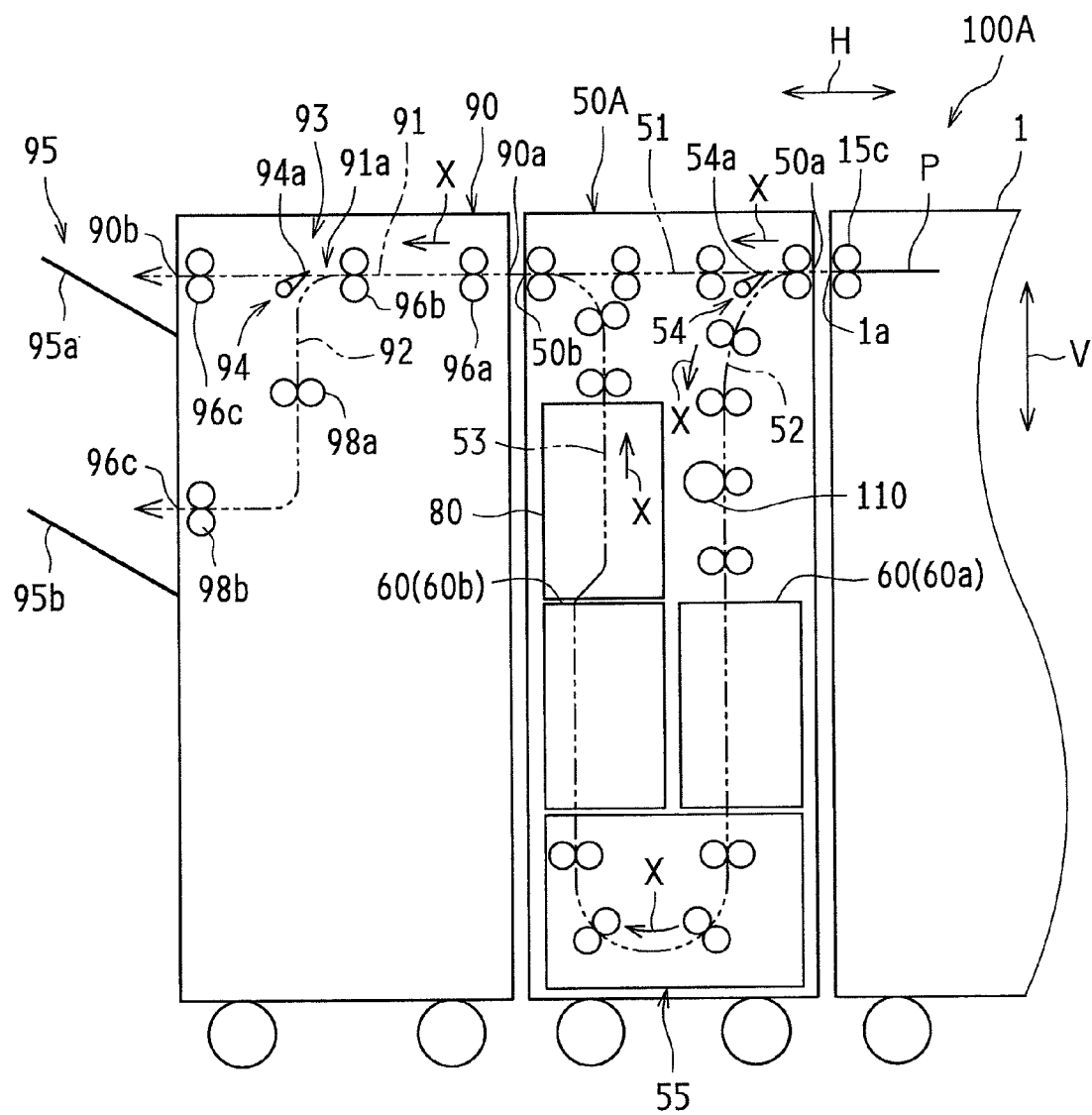
FIG. 12 is a schematic front view showing the vicinity of processing units of an image forming apparatus according to a second embodiment.

FIG. 12 is a schematic front view showing the vicinity of processing units of an image forming apparatus 100A according to the second embodiment.

The image forming apparatus 100A according to the second embodiment shown in FIG. 12 is configured such that a first relay unit 50A in which the first relay unit 50 includes the reading portion 80 is provided instead of the first and the second relay units 50 and 70 in the image forming apparatus 100 according to the first embodiment.

Figure 13:
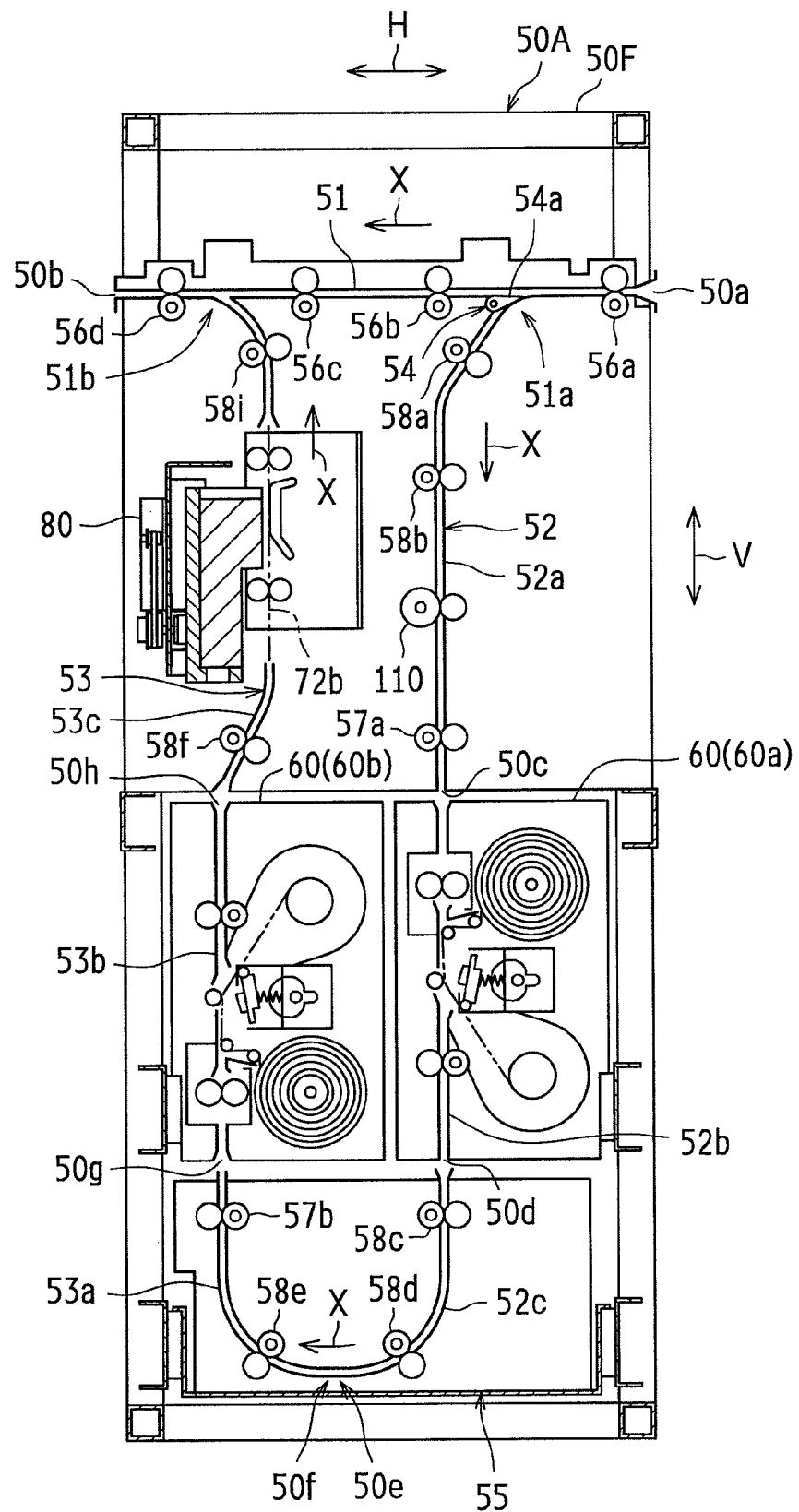
FIG. 13 is a front view showing the schematic configuration of a first relay unit in the image forming apparatus according to the second embodiment.

FIG. 13 is a front view showing the schematic configuration of the first relay unit 50A in the image forming apparatus 100A according to the second embodiment.

The first relay unit 50A shown in FIGS. 12 and 13 is provided with the reading portion 80 at part of the transport path corresponding to the sub transport roller pairs 58g and 58h on the downstream coating transport path 53c in the first relay unit 50 shown in FIG. 2.

The image forming apparatus 100A according to the second embodiment described above achieves a similar advantage as that of the image forming apparatus 100 according to the first embodiment. Moreover, since the second relay unit 70 is not provided, the transport distance of the calibration recording sheet 40, that is, the time required to the transport can be accordingly shortened. Furthermore, since the coating portions 60 (60a and 60b) are arranged on both the sub transport paths 52 and 53, of the first sub transport path 52 and the second sub transport path 53, and the reading portion 80 is disposed on the second sub transport path 53, the image forming apparatus 100A can be made compact. Furthermore, in this case, by selling the first relay unit 50A as an optional extra, a user can obtain not only the coating portions 60 but also the reading portion 80 by merely purchasing the first relay unit 50A.

Third Embodiment

Figure 14:
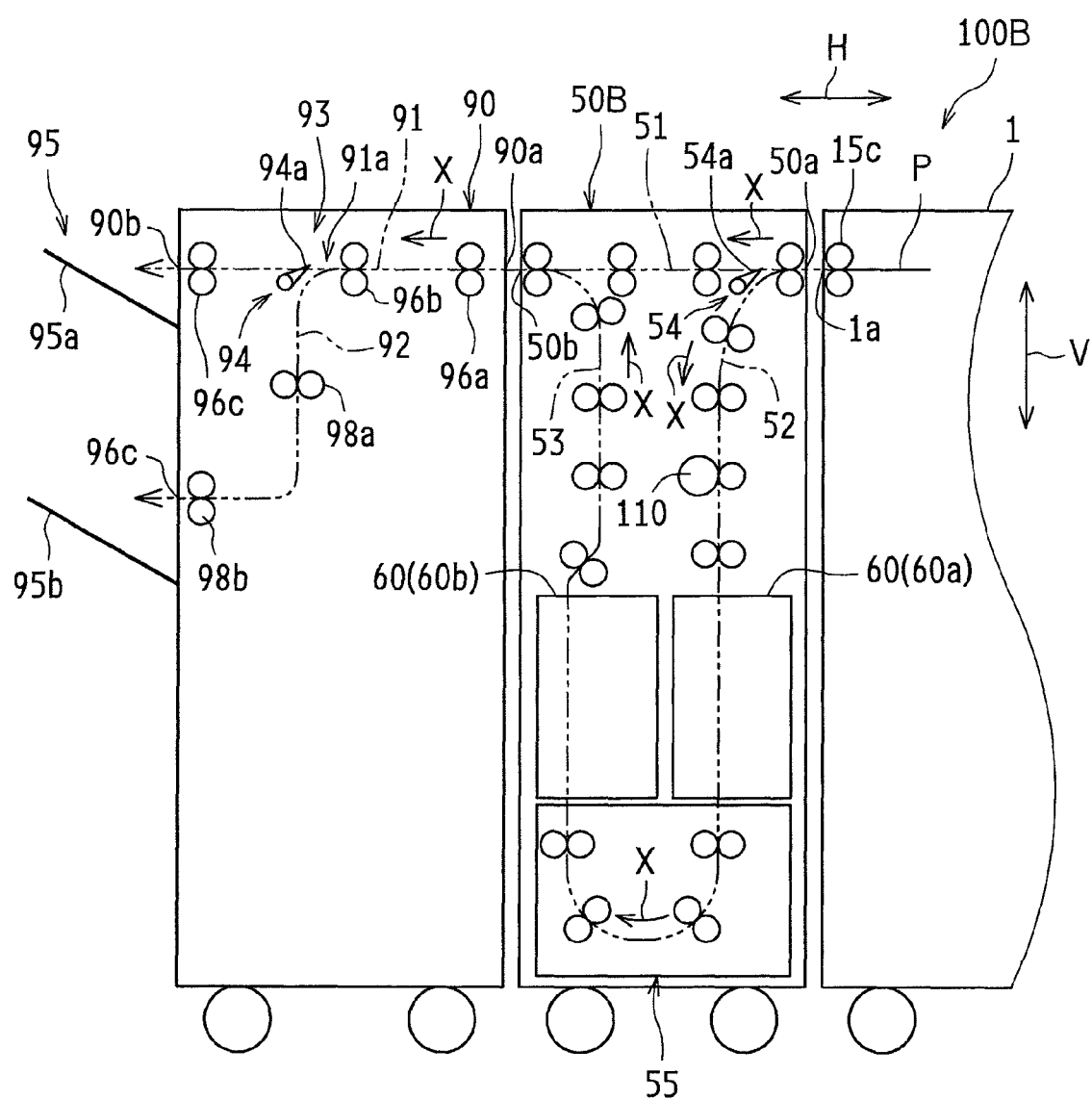
FIG. 14 is a schematic front view showing the vicinity of processing units of an image forming apparatus according to a third embodiment.

FIG. 14 is a schematic front view showing the vicinity of processing units of an image forming apparatus 100B according to the third embodiment.

The image forming apparatus 100B according to the third embodiment shown in FIG. 14 is configured such that the second relay unit 70 is removed from the image forming apparatus 100 according to the first embodiment.

The image forming apparatus 100B according to the third embodiment described above achieves a similar advantage as that of the image forming apparatus 100 according to the first embodiment. This configuration is advantageous particularly in the case where at least the calibration process is not performed in the relay unit.

Other Embodiment

In the foregoing first to third embodiments, the relay units (specifically, the first relay units 50 and 50A and the second relay unit 70) are relay units that perform relaying between the image forming apparatus main body 1 and the discharge unit 90, but may be relay units that perform relaying between the image forming apparatus main body 1 and a post-processing unit provided with a post-processing portion that performs preset post-processing after the image formation (e.g., a post-processing portion including at least one of a sorting portion, a finisher portion, and a stapler portion).

Furthermore, in the foregoing first to third embodiments, the processing units are relay units, but may be post-processing units.

Furthermore, in the foregoing first to third embodiments, the main transport paths and the sub transport paths (specifically, the first main transport path 51 and the second main transport path 71, and the first sub transport path 52, the second sub transport path 53, the third sub transport path 72, and the fourth sub transport path 73) are arranged in the relay units (specifically, the first relay units 50 and 50A and the second relay unit 70), but may be arranged in the image forming apparatus main body in the configuration where the relay units and the image forming apparatus main body are formed in one piece.

The present invention may be embodied in various other forms without departing from the spirit, gist, or essential characteristics thereof. The embodiments disclosed in this application are to be considered in all respects as illustrative and not limiting. The scope of the invention is indicated by the appended claims rather than by the foregoing description. All variations and modifications falling within the equivalency range of the appended claims are intended to be embraced therein.

What is claimed is:

1. An image forming apparatus, comprising:
   a coating portion configured to perform a coating process that forms a coating film on a recording sheet with an image formed thereon;
   a main transport path configured to transport the recording sheet with the image formed thereon and to have a branching portion formed thereon; and
   a sub transport path configured to be once branched from the main transport path at the branching portion and to be returned to the main transport path again;
   wherein the coating portion is disposed on the sub transport path,
   wherein the coating portion includes a first coating portion that performs the coating process on one face of the recording sheet and a second coating portion that performs the coating process on the other face of the recording sheet,
   wherein a merging portion is formed on the main transport path on a downstream side in a recording sheet transport direction of the branching portion,
   the sub transport path includes a first sub transport path that is branched at the branching portion, a second sub transport path that is merged at the merging portion, and a third sub transport path that interconnects a downstream end of the first sub transport path and an upstream end of the second sub transport path,
   wherein the first coating portion is arranged on the first sub transport path and the second coating portion is arranged on the second sub transport path,
   wherein on the third sub transport path, at least one transport roller pair is arranged on an upstream side in the transport direction, and a registration roller pair is arranged on a downstream side in the transport direction, and
   wherein the third sub transport path carries the recording sheet that has been completely pulled out from the first coating portion to the second sub transport path.

2. The image forming apparatus according to claim 1, wherein at least one of the first coating portion and the second coating portion is attachable and removable.

3. The image forming apparatus according to claim 1, wherein the first and second coating portions are arranged such that a length of the sub transport path between a position at which the coating process is performed on the recording sheet in the first coating portion and a position at which the coating process is performed on the recording sheet in the second coating portion is larger than a length of the recording sheet of a maximum size.

4. The image forming apparatus according to claim 1, wherein the coating portion is disposed such that a length of the first sub transport path between a position at which the coating process is performed on the recording sheet in the first coating portion and a transport roller pair that is disposed in closest proximity to the branching portion on an upstream side in a transport direction of the branching portion is larger than a length of the recording sheet of a maximum size.

5. The image forming apparatus according to claim 1, further comprising:
a control portion configured to instruct a transport speed of the recording sheet,
wherein the control portion instructs the transport speed of the recording sheet that is being transported on the sub transport path to be made smaller than a transport speed of the recording sheet that is being transported on the main transport path at least in a period during which the coating process is performed.

6. The image forming apparatus according to claim 5, wherein a timing at which the control portion instructs the transport speed to be made small when performing the coating process corresponds to a timing after an upstream edge in the transport direction of the recording sheet that is being transported by a transport roller pair disposed in closest proximity to the branching portion on an upstream side in a transport direction of the branching portion has passed through the transport roller pair on the main transport path.

7. The image forming apparatus according to claim 1, further comprising:
a curling correcting portion configured to correct curling of the recording sheet, disposed on an upstream side in a transport direction of the coating portion on the sub transport path.

8. The image forming apparatus according to claim 1, further comprising:
a coating film in which a transparent resin material is attached to a film base member,
wherein the coating process is a process that causes the transparent resin material disposed on the film base member to be thermally attached to the recording sheet with the image formed thereon.

9. The image forming apparatus according to claim 1, further comprising:
a processing unit configured to be attachable to and removable from an image forming apparatus main body that forms an image on the recording sheet,
wherein the coating portion, the main transport path, and the sub transport path are arranged in the processing unit.

10. The image forming apparatus according to claim 1, wherein the recording sheet is completely pulled out from the first coating portion by rotation of the at least one transport roller pair, temporarily stopped at the registration pair, and then carried to the second coating portion arranged on the second transport path by rotation of the at least one transport roller pair and the registration roller pair.

11. A processing unit that is attachable to and removable from an image forming apparatus main body that forms an image on a recording sheet, comprising:
a coating portion configured to perform a coating process that forms a coating film on the recording sheet with the image formed thereon by the image forming apparatus main body;
a main transport path configured to transport the recording sheet with the image formed thereon by the image forming apparatus main body and to have a branching portion formed thereon; and
a sub transport path configured to be once branched from the main transport path at the branching portion and to be returned to the main transport path again;
wherein the coating portion is disposed on the sub transport path,
wherein the coating portion includes a first coating portion that performs the coating process on one face of the recording sheet and a second coating portion that performs the coating process on the other face of the recording sheet,
wherein a merging portion is formed on the main transport path on a downstream side in a recording sheet transport direction of the branching portion,
the sub transport path includes a first sub transport path that is branched at the branching portion, a second sub transport path that is merged at the merging portion, and a third sub transport path that interconnects a downstream end of the first sub transport path and an upstream end of the second sub transport path,
wherein the first coating portion is arranged on the first sub transport path and the second coating portion is arranged on the second sub transport path,
wherein on the third sub transport path, at least one transport roller pair is arranged on an upstream side in the transport direction, and a registration roller pair is arranged on a downstream side in the transport direction, and
wherein the third sub transport path carries the recording sheet that has been completely pulled out from the first coating portion to the second sub transport path.

12. The image forming apparatus according to claim 11, wherein the recording sheet is completely pulled out from the first coating portion by rotation of the at least one transport roller pair, temporarily stopped at the registration pair, and then carried to the second coating portion arranged on the second transport path by rotation of the at least one transport roller pair and the registration roller pair.

* * * * *